United States Patent
Liu et al.

(10) Patent No.: US 10,440,237 B2
(45) Date of Patent: Oct. 8, 2019

(54) DISPLAY DEVICE COMPRISING A DATA LINE THAT INCLUDES A MAIN LINE SECTION, A FIRST LINE SECTION AND A SECOND LINE SECTION SPACED APART FROM ONE ANOTHER

(71) Applicant: Au Optronics Corporation, Hsinchu (TW)

(72) Inventors: Pin-Miao Liu, Hsinchu County (TW); Ting-Wei Guo, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 15/871,073

(22) Filed: Jan. 15, 2018

(65) Prior Publication Data
US 2019/0132490 A1   May 2, 2019

(30) Foreign Application Priority Data

Oct. 30, 2017   (TW) .............................. 106137458 A

(51) Int. Cl.
 G09G 5/02    (2006.01)
 H04N 3/28    (2006.01)
 G09G 5/00    (2006.01)

(52) U.S. Cl.
 CPC ................ *H04N 3/28* (2013.01); *G09G 5/00* (2013.01)

(58) Field of Classification Search
 None
 See application file for complete search history.

(56) References Cited

U.S. PATENT DOCUMENTS

| 7,697,101 B2 | 4/2010 | Hong |
| 8,018,399 B2 | 9/2011 | Liu |
| 9,472,734 B1* | 10/2016 | Chen ..................... H01L 33/505 |
| 2003/0085885 A1 | 5/2003 | Nakayoshi et al. |
| 2006/0123293 A1* | 6/2006 | Kim ..................... G09G 3/3291 714/724 |
| 2015/0287378 A1* | 10/2015 | Jeong .................. G09G 3/3688 345/694 |

(Continued)

FOREIGN PATENT DOCUMENTS

| CN | 101630491 | 1/2010 |
| CN | 102338959 | 2/2012 |

(Continued)

*Primary Examiner* — Lunyi Lao
*Assistant Examiner* — Kirk W Hermann
(74) *Attorney, Agent, or Firm* — JCIPRNET

(57) ABSTRACT

A display device is provided. A data line includes a main line section, a first line section and a second line section spaced apart from one another. The first and second line sections respectively cross over a first scan line set to form first and second crossing regions. The main line section crosses over a second scan line set to form third crossing regions. The first line section is electrically connected to the main line section and one scan line of a third scan line set via a first switch element. The second line section is electrically connected to the main line section and another scan line of the third scan line set via a second switch element. First pixel units, second pixel units and third pixel units correspond respectively to the first crossing regions, the second crossing regions and the third crossing regions.

29 Claims, 8 Drawing Sheets

(56) References Cited

U.S. PATENT DOCUMENTS

| | | | |
|---|---|---|---|
| 2015/0348504 A1* | 12/2015 | Sakariya | G09G 3/3233 |
| | | | 345/206 |
| 2015/0371585 A1* | 12/2015 | Bower | G09G 3/32 |
| | | | 345/1.1 |
| 2016/0125783 A1* | 5/2016 | Huang | G09G 3/2003 |
| | | | 345/694 |
| 2017/0221936 A1 | 8/2017 | Yamamoto et al. | |

FOREIGN PATENT DOCUMENTS

| | | | |
|---|---|---|---|
| CN | 106920825 | | 7/2017 |
| CN | 106920825 A | * | 7/2017 |

* cited by examiner

US 10,440,237 B2

DISPLAY DEVICE COMPRISING A DATA LINE THAT INCLUDES A MAIN LINE SECTION, A FIRST LINE SECTION AND A SECOND LINE SECTION SPACED APART FROM ONE ANOTHER

CROSS-REFERENCE TO RELATED APPLICATION

This application claims the priority benefit of Taiwan application serial no. 106137458, filed on Oct. 30, 2017. The entirety of the above-mentioned patent application is hereby incorporated by reference herein and made a part of this specification.

BACKGROUND

Technical Field

The disclosure relates to a display device, and more particularly, to a non-planar or irregular (or specially-shaped) display device.

Related Art

Recently, there has been an increasing demand for diversity of shapes of display devices as the application field of the display devices has been extended. In terms of display devices for entertainment, wearable display devices and so on, traditional planar display devices have failed to satisfy users' needs. Therefore, to suit the user's needs, researchers and developers in this field are actively developing non-planar display devices or display devices having an irregular substrate. However, in the case of non-planar display devices, problems encountered by current technology includes insufficient design flexibility due to the fact that variation in a three-dimensional structure can only be achieved by coupling a plurality of non-planar display devices, and poor uniformity in a display image.

SUMMARY

The disclosure provides a display device applicable to substrates of various shapes (e.g., non-planar substrates or irregular (or specially-shaped) substrates), allowing excellent design flexibility in practical application, and providing good uniformity in a display image.

The display device of the disclosure includes a plurality of scan lines, at least one first switch element, at least one second switch element, at least one data line, a plurality of first pixel units, a plurality of second pixel units and a plurality of third pixel units. The plurality of scan lines are disposed on a substrate, wherein the scan lines have a first scan line set, a second scan line set and a third scan line set. The at least one first switch element and the at least one second switch element are disposed on the substrate. The at least one data line is disposed on the substrate, wherein the data line includes a main line section, a first line section and a second line section spaced apart from one another, wherein the first line section crosses over the first scan line set to form a plurality of first crossing regions, the second line section crosses over the first scan line set to form a plurality of second crossing regions, the main line section crosses over the second scan line set to form a plurality of third crossing regions, the first line section is electrically connected to the main line section and one scan line of the third scan line set via the first switch element, and the second line section is electrically connected to the main line section and another scan line of the third scan line set via the second switch element. The plurality of first pixel units, the plurality of second pixel units and the plurality of third pixel units are disposed on the substrate and correspond respectively to the first crossing regions, the second crossing regions and the third crossing regions, wherein each of the first pixel units, the second pixel units and the third pixel units includes at least one switching element and at least one micro-light emitting element electrically connected to the switching element, and the switching elements of the first pixel units, the second pixel units and the third pixel units are respectively electrically connected to the first line section and the first scan line set in the corresponding first crossing regions, the second line section and the first scan line set in the corresponding second crossing regions, and the main line section and the second scan line set in the corresponding third crossing regions.

Based on the above, in the display device of the disclosure, the data line includes the main line section, the first line section and the second line section spaced apart from one another, wherein the first line section crosses over the first scan line set to form a plurality of first crossing regions, the second line section crosses over the first scan line set to form a plurality of second crossing regions, the main line section crosses over the second scan line set to form a plurality of third crossing regions, the first line section is electrically connected to the main line section and one scan line of the third scan line set via the first switch element, the second line section is electrically connected to the main line section and another scan line of the third scan line set via the second switch element, and the plurality of first pixel units, the plurality of second pixel units and the plurality of third pixel units are disposed corresponding to the first crossing regions, the second crossing regions and the third crossing regions, respectively, such that regardless of the various shapes of the substrate, the first pixel units, the second pixel units and the third pixel units may be uniformly distributed in the display device. Accordingly, the display device of the disclosure is, for example, a non-planar or irregular (or specially-shaped) display device. Moreover, the display device of the disclosure not only allows excellent design flexibility in practical application, but also maintains better uniformity in a display image when performing display.

To make the above features and advantages of the disclosure more comprehensible, several embodiments accompanied with drawings are described in detail as follows.

DETAILED DESCRIPTION OF DISCLOSED EMBODIMENTS

Figure 1:
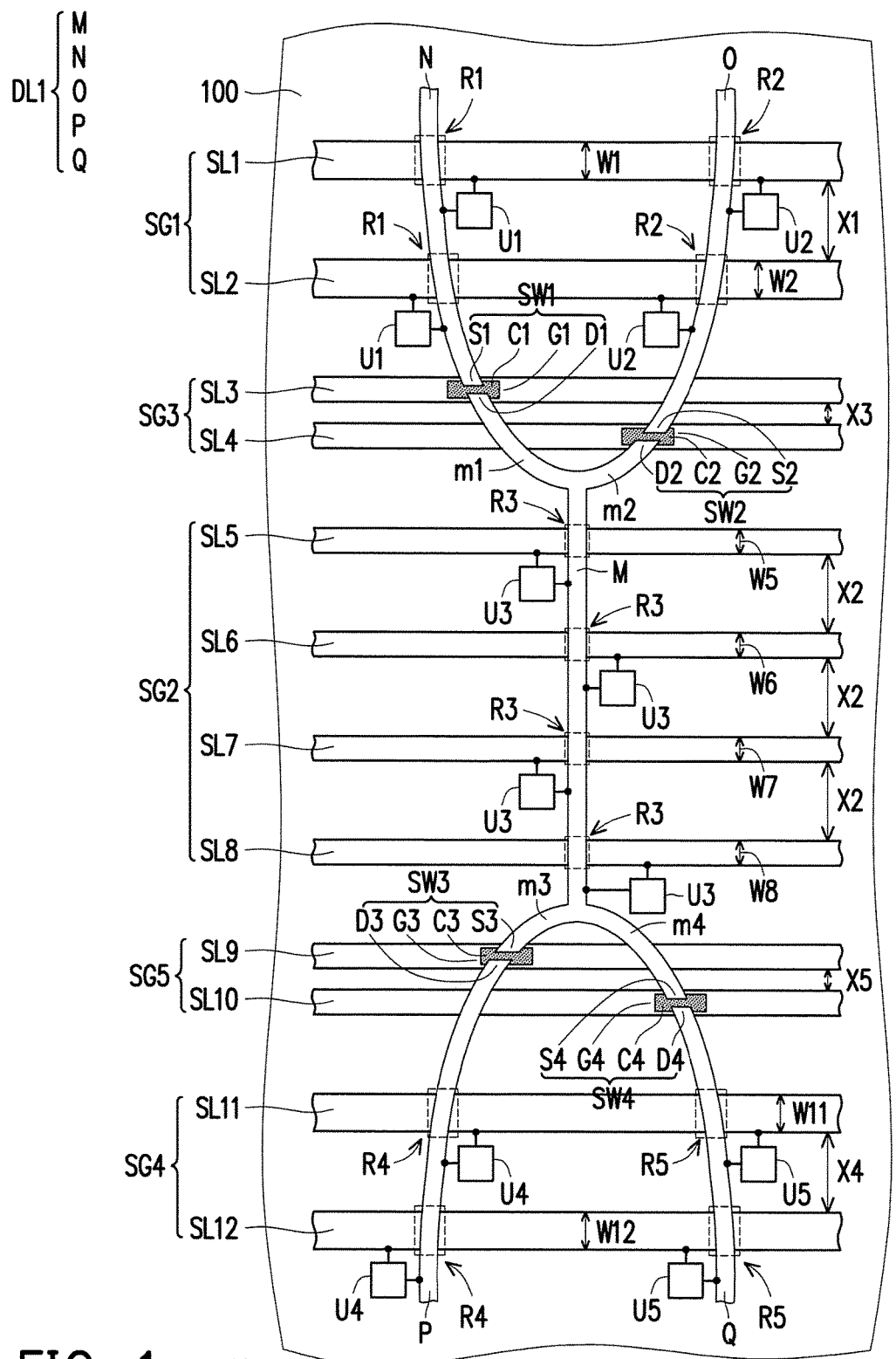
FIG. 1 is a schematic partial top view of a display device according to an embodiment of the disclosure.

Several embodiments of the disclosure will be disclosed below with reference to drawings. For clarity, many details in practice will be described together with the following description. However, it should be understood that these details in practice are not used to limit the disclosure. That is, in some embodiments of the disclosure, these details in practice are unnecessary. In addition, to simplify the drawings, some conventional structures and elements in the drawings will be shown in a simple and schematic manner.

The term "about," "approximately," "essentially" or "substantially" as used herein is inclusive of the stated value and means within an acceptable range of deviation for the particular value as determined by persons of ordinary skill in the art, considering the measurement in question and the error associated with measurement of the particular quantity (i.e., the limitations of the measurement system). For example, "about" may mean within one or more standard deviations, or within, for example, ±30%, ±20%, ±15%, ±10%, ±5% of the stated value. Moreover, a relatively acceptable range of deviation or standard deviation may be chosen for the term "about," "approximately," "essentially" or "substantially" as used herein based on optical properties, etching properties or other properties, instead of applying one standard deviation across all the properties.

In the accompanying drawings, thicknesses of layers, films, panels, regions and so on are exaggerated for clarity. Throughout the specification, the same reference numerals in the accompanying drawings denote the same elements. It should be understood that when an element such as a layer, film, region or substrate is referred to as being "on" or "connected to" another element, it can be directly on or connected to the other element, or intervening elements may also be present. In contrast, when an element is referred to as being "directly on" or "directly connected to" another element, there are no intervening elements present. As used herein, the term "connected" may refer to physically connected and/or electrically connected (or coupled). Therefore, the electrical connection (or coupling) may be refer an intervening elements exist between two elements.

Unless otherwise defined, all Willis (including technical and scientific terms) used herein have the same meaning as commonly understood by persons of ordinary skill in the art. It will be further understood that terms, such as those defined in commonly used dictionaries, should be interpreted as having a meaning that is consistent with their meaning in the context of the relevant art and the disclosure and will not be interpreted in an idealized or overly formal sense unless expressly so defined herein.

In the disclosure, to facilitate understanding, positions of a source and a drain in a transistor in the drawings are exemplary and not intended to be limiting. The reason is that the source and the drain in the transistor may change with current direction, or may differ depending on whether the transistor is an N-type transistor or a P-type transistor.

FIG. 1 is a schematic partial top view of a display device according to an embodiment of the disclosure. FIG. 2A to FIG. 2E are respectively circuit diagrams of a pixel unit U1, a pixel unit U2, a pixel unit U3, a pixel unit U4 and a pixel unit U5 in FIG. 1. Referring to FIG. 1, a display device 10 is preferably applied in a non-planar display device, but is not limited thereto. In other embodiments, the display device 10 may be applied in an irregular (or specially-shaped) display device. In the present embodiment, the display device 10 may include a substrate 100, a plurality of scan lines SL1 to SL12, a switch element SW1 (or namely first switch element), a switch element SW2 (or namely second switch element), a data line DL1, a plurality of pixel units U1 (or namely first pixel units), a plurality of pixel units U2 (or namely second pixel units) and a plurality of pixel units U3 (or namely third pixel units). In addition, the display device 10 may further include a switch element SW3 (or namely third switch element), a switch element SW4 (or namely fourth switch element), a plurality of pixel units U4 (or namely fourth pixel units) and a plurality of pixel units U5 (or namely fifth pixel units). To describe the design of the display device of the disclosure in detail, an example is given below in which one data line (i.e., the data line DL1) is provided. However, it should be understood by persons of ordinary skill in the art that the display device generally includes a plurality of data lines. Therefore, persons of ordinary skill in the art may understand the overall structure or layout of the display device 10 according to the following description of the partial display device 10 having one data line.

In the present embodiment, the substrate 100 may be, for example but not limited to, a non-planar substrate. In other embodiments, the substrate 100 may be an irregular (or specially-shaped) substrate. For example, if the substrate 100 is a non-planar substrate, the substrate 100 may be a three-dimensional substrate obtained by modeling a planar substrate or a three-dimensional substrate obtained by direct shaping. In one embodiment, the substrate 100 has, for example, a diabolo shape, a dumbbell shape, a bone shape or other suitable shape. That is, the substrate 100 may be a three-dimensional substrate having a concave-convex profile. If the substrate 100 is an irregular (or specially-shaped) substrate, the substrate 100 may have a non-rectangular polygonal shape, or may have at least one part having an arc shape, or may have other suitable irregular shape. In addition, in the present embodiment, the substrate 100 may be made of glass, metal, plastic, or other suitable material.

The scan lines SL1 to SL12 are arranged on the substrate 100. In the present embodiment, the scan lines SL1 to SL12 may have scan line sets (or namely scan line groups) SG1 to SG3, wherein the scan line set SG1 (or namely first scan line set) includes the scan lines SL1 to SL2, the scan line set SG2 (or namely second scan line set) includes the scan lines SL5 to SL8, and the scan line set SG3 (or namely third scan line set) includes the scan lines SL3 to SL4. In some embodiments, the scan lines SL1 to SL12 may further have scan line sets (or namely scan line groups) SG4 to SG5, wherein the scan line set SG4 (or namely fourth scan line set) includes the scan lines SL11 to SL12, and the scan line set SG5 (or namely fifth scan line set) includes the scan lines SL9 to SL10. At least one of the scan lines SL1 to SL12 may have a single-layer or multilayer structure, and is generally made of metal considering conductivity. However, the disclosure is not limited thereto. According to other embodiments, the scan lines SL1 to SL12 may be made of, for example, an alloy, a nitride of the aforesaid material, an oxide of the aforesaid material, an oxynitride of the aforesaid material, a transparent conductive material, other non-metal conductive material, or other suitable material.

Although FIG. 1 illustrates that the scan line set SG1 includes two scan lines SL1 to SL2 and that the scan line set SG2 includes four scan lines SL5 to SL8, the disclosure is not limited thereto. In some embodiments, the scan line set SG4 includes two scan lines SL11 to SL12 for exemplary purposes, but the disclosure is not limited thereto. In other embodiments, the number of scan lines in each of the scan line sets SG1, SG2 and SG4 may be adjusted according to the actual architecture and requirements of the display device 10 (e.g., a non-planar or irregular (or specially-shaped) display device).

Although FIG. 1 illustrates that the scan line set SG3 includes two scan lines SL3 to SL4 for exemplary purposes, the disclosure is not limited thereto. In some embodiments, the scan line set SG5 includes two scan lines SL9 to SL10 for exemplary purposes, but the disclosure is not limited thereto. In other embodiments, the scan line sets SG3 and SG5 may each include three or more scan lines, according to the actual architecture and requirements of the display device 10 (e.g., a non-planar or irregular (or specially-shaped) display device).

The data line DL1 is arranged on the substrate 100. In the present embodiment, the data line DL1 includes a main line section M, a line section N and a line section O, wherein the main line section M, the line section N and the line section O are structurally spaced apart from one another. In some embodiments, the data line DL1 may further include a line section P and a line section Q, wherein the main line section M, the line section P and the line section Q are spaced apart from one another. In the present embodiment, the data line DL1 may interlace with or cross over the scan lines SL1 to SL12. For example, the line section N may interlace with or cross over the scan line set SG1 to form a plurality of crossing sections R1 (as shown in dashed lines in FIG. 1), the line section O may interlace with or cross over the scan line set SG1 to form a plurality of crossing sections R2 (as shown in dashed lines in FIG. 1), and the main line section M may interlace with or cross over the scan line set SG2 to form a plurality of crossing sections R3 (as shown in dashed lines in FIG. 1). In some embodiments, the line section P may interlace with or cross over the scan line set SG4 to form a plurality of crossing sections R4 (as shown in dashed lines in FIG. 1), and the line section Q may interlace with or cross over the scan line set SG4 to form a plurality of crossing sections R5 (as shown in dashed lines in FIG. 1). The data line DL1 may have a single-layer or multilayer structure, and is generally made of metal considering conductivity. However, the disclosure is not limited thereto. According to other embodiments, the data line DL1 may be made of, for example, an alloy, a nitride of the aforesaid material, an oxide of the aforesaid material, an oxynitride of the aforesaid material, a transparent conductive material, other non-metal conductive material, or other suitable material.

In addition, in the present embodiment, the scan lines SL1 to SL12 may be located in a different layer from the data line DL1, and an insulating layer (not illustrated) is interposed between the scan lines SL1 to SL12 and the data line DL1. The insulating layer (not illustrated) may have a single-layer or multilayer structure, and may be made of an inorganic material, an organic material, or other suitable material, wherein the inorganic material is, for example, silicon oxide, silicon nitride, silicon oxynitride, or other suitable material, and the organic material is, for example, polyimide-based resin, epoxy-based resin, acrylic-based resin, or other suitable material.

The switch elements SW1 and SW2 are disposed on the substrate 100. In the present embodiment, the line section N is electrically connected to the main line section M and the scan line SL3 of the scan line set SG3 via the switch element SW1, and the line section O is electrically connected to the main line section M and the scan line SL4 of the scan line set SG3 via the switch element SW2. In some embodiments, the switch elements SW3 and SW4 are disposed on the substrate 100. The line section P is electrically connected to the main line section M and the scan line SL9 of the scan line set SG5 via the switch element SW3, and the line section Q is electrically connected to the main line section M and the scan line SL10 of the scan line set SG5 via the switch element SW4.

In the present embodiment and some other embodiments, at least one of the switch element SW1, the switch element SW2, the switch element SW3 and the switch element SW4 may be any type of thin film transistor well-known to persons of ordinary skill in the art. The present embodiment gives an example in which bottom-gate thin film transistors are provided. The switch element SW1 includes a gate G1, a channel layer CH1, a source S1 and a drain D1, wherein the channel layer CH1 is located above the gate G1, and the source S1 and the drain D1 are located above the channel layer CH1; the switch element SW2 includes a gate G2, a channel layer CH2, a source S2 and a drain D2, wherein the channel layer CH2 is located above the gate G2, and the source S2 and the drain D2 are located above the channel layer CH2; the switch element SW3 includes a gate G3, a channel layer CH3, a source S3 and a drain D3, wherein the channel layer CH3 is located above the gate G3, and the source S3 and the drain D3 are located above the channel layer CH3; and the switch element SW4 includes a gate G4, a channel layer CH4, a source S4 and a drain D4, wherein the channel layer CH4 is located above the gate G4, and the source S4 and the drain D4 are located above the channel layer CH4. In other embodiments, at least one of the switch element SW1, the switch element SW2, the switch element SW3 and the switch element SW4 may be a top-gate thin film transistor or other suitable transistor. In an example in which top-gate thin film transistors are provided, the switch element SW1 includes the gate G1, the channel layer CH1, the source S1 and the drain D1. The channel layer CH1 is located below the gate G1, and the other components are as previously described. The rest of the switch elements may be deduced by analogy.

In the present embodiment, the gate G1 of the switch element SW1 is connected to the scan line SL3, the source S1 of the switch element SW1 is connected to the line section N, and the drain D1 of the switch element SW1 is connected to the main line section M; the gate G2 of the switch element SW2 is connected to the scan line SL4, the source S2 of the switch element SW2 is connected to the line section O, and the drain D2 of the switch element SW2 is connected to the main line section M. In one embodiment, a portion of the scan line SL3 serves as the gate G1, a portion of the scan line SL4 serves as the gate G2, the source S1 may be a portion of the line section N (it can be said that the source S1 and the line section N form a continuous conductive pattern), the source S2 may be a portion of the line section O (it can be said that the source S2 and the line section O form a continuous conductive pattern), and the drain D1 and the drain D2 may respectively be portions of the main line section M (it can be said that the drain D1 and the drain D2 respectively form a continuous conductive pattern with the main line section M). However, the disclosure is not limited thereto. In some embodiments, the gate G3 of the switch element SW3 is connected to the scan line SL9, the source S3 of the switch element SW3 is connected to the main line section M, and the drain D3 of the switch element SW3 is connected to the line section P; the gate G4 of the switch element SW4 is connected to the scan line SL10, the drain D4 of the switch element SW4 is connected to the line section Q, and the source S4 of the switch element SW4 is connected to the main line section M. In one embodiment, a portion of the scan line SL9 serves as the gate G3, a portion of the scan line SL10 serves as the gate G4, the source S3 may be a portion of the line section P (it can be said that the source S3 and the line section P form a continuous conductive pattern), the source S4 may be a portion of the line section Q (it can be said that the source S4 and the line section Q form a continuous conductive pattern), and the drain D3 and drain D4 may respectively be portions of the main line section M (it can be said that the drain D3 and drain D4 respectively form a continuous conductive pattern with the main line section M). However, the disclosure is not limited thereto.

In one embodiment, when a turn-on signal is input to the scan line SL3, the scan line SL3 is electrically connected to the gate G1 to turn on the switch element SW1. At this moment, when a data signal is input to the line section N, the line section N is electrically connected to the source S1 to transmit the data signal to the main line section M via the turned-on switch element SW1. In another embodiment, when a turn-on signal is input to the scan line SL4, the scan line SL4 is electrically connected to the gate G2 to turn on the switch element SW2. At this moment, when a data signal is input to the line section O, the line section O is electrically connected to the source S2 to transmit the data signal to the main line section M via the turned-on switch element SW2. In another embodiment, when a turn-on signal is input to the scan line SL9, the scan line SL9 is electrically connected to the gate G3 to turn on the switch element SW3. At this moment, when a data signal is input to the main line section M, the main line section M is electrically connected to the drain D3 to transmit the data signal to the line section P via the turned-on switch element SW3. In another embodiment, when a turn-on signal is input to the scan line SL10, the scan line SL10 is electrically connected to the gate G4 to turn on the switch element SW4. At this moment, when a data signal is input to the main line section M, the main line section M is electrically connected to the drain D4 to transmit the data signal to the line section Q via the turned-on switch element SW4.

In the present embodiment, the main line section M may include, for example, two branches m1 and m2. The branch m1 is electrically connected to the switch element SW1, and the branch m2 is electrically connected to the switch element SW2. From another point of view, in the present embodiment, the drain D1 may be a portion of the branch m1 of the main line section M (it can be said that the drain D1 and the branch m1 of the main line section M form a continuous conductive pattern), and the drain D2 may be a portion of the branch m2 of the main line section M (it can be said that the drain D2 and the branch m2 of the main line section M form a continuous conductive pattern). In addition, in the present embodiment, the length of the branch m1 and the length of the branch m2 may be different. The length of the branch m1 is, for example, greater than the length of the branch m2. However, the disclosure is not limited thereto. In some embodiments, the main line section M may also include another two branches m3 and m4 disposed opposing the branches m1 and m2. The branch m3 is electrically connected to the switch element SW3, and the branch m4 is electrically connected to the switch element SW4. The source S3 may be a portion of the branch m3 of the main line section M (it can be said that the source S3 and the branch m3 of the main line section M form a continuous conductive pattern), and the source S4 may be a portion of the branch m4 of the main line section M (it can be said that the source S4 and the branch m4 of the main line section M form a continuous conductive pattern). In addition, the length of the branch m3 and the length of the branch m4 may be different. The length of the branch m4 is, for example, greater than the length of the branch m3. However, the disclosure is not limited thereto.

The plurality of pixel units U1, the plurality of pixel units U2 and the plurality of pixel units U3 are disposed on the substrate 100. The plurality of pixel units U1 are disposed corresponding to the plurality of crossing sections R1, the plurality of pixel units U2 are disposed corresponding to the plurality of crossing sections R2, and the plurality of pixel units U3 are disposed corresponding to the plurality of crossing sections R3. In some embodiments, the plurality of pixel units U4 and the plurality of pixel units U5 are disposed on the substrate 100. The plurality of pixel units U4 are disposed corresponding to the plurality of crossing sections R4, and the plurality of pixel units U5 are disposed corresponding to the plurality of crossing sections R5. The following description is given on the premise that the pixel units U1 to U5 are present, but the disclosure is not limited thereto. In other embodiments, the pixel units U4 and U5 may be absent from the display device 10.

Figure 2A:
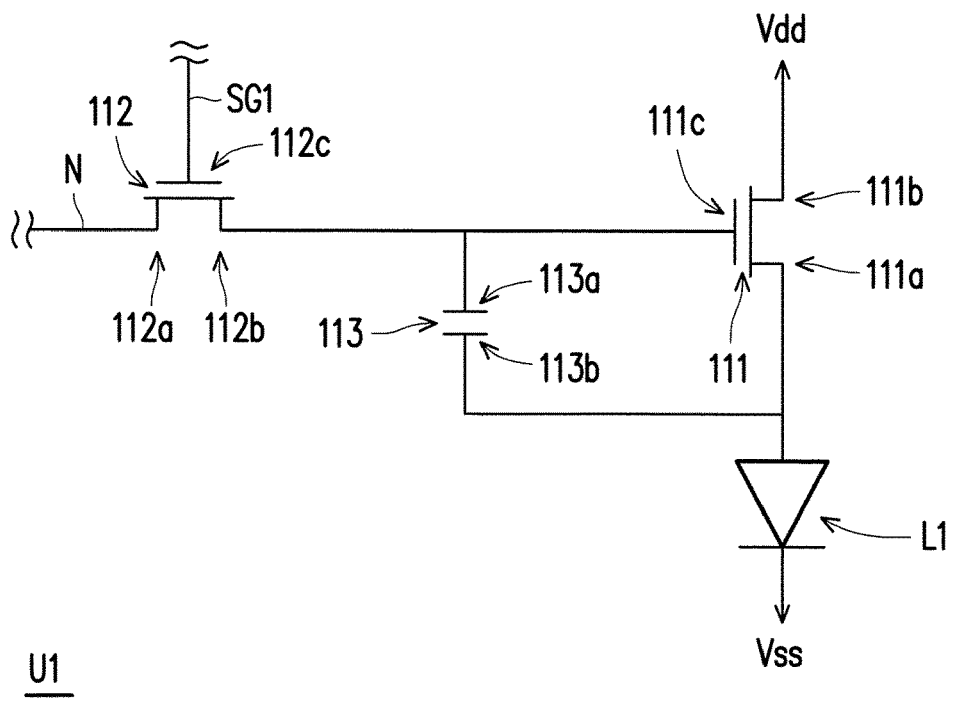
FIG. 2A to FIG. 2E are respectively circuit diagrams of a pixel unit U1, a pixel unit U2, a pixel unit U3, a pixel unit U4 and a pixel unit U5 in FIG. 1.

Referring to FIG. 1 and FIG. 2A together, at least one pixel unit U1 may include a switching element 111, a switching element 112 and a micro-light emitting element L1, wherein the switching elements 111 and 112 are electrically connected to the micro-light emitting element L1. In addition, at least one pixel unit U1 further includes a capacitor 113, wherein the capacitor 113 is electrically connected to the switching element 111, the switching element 112 and the micro-light emitting element L1. In the present embodiment, description is given of an example in which at least one pixel unit U1 is of a two-transistor-one-capacitor (2T1C) structure. However, the disclosure is not limited thereto. In the disclosure, the numbers of switching elements (abbreviated as T) and capacitors (abbreviated as C) in each pixel unit U1 are not limited. In other embodiments, at least one pixel unit U1 may be of a one-transistor-one-capacitor (1T1C) structure, a three-transistor-one-capacitor (3T1C) structure, a three-transistor-two-capacitor (3T2C) structure, a four-transistor-one-capacitor (4T1C) structure, a four-transistor-two-capacitor (4T2C) structure, a five-transistor-one-capacitor (5T1C) structure, a five-transistor-two-capacitor (5T2C) structure, a six-transistor-one-capacitor (6T1C) structure, a six-transistor-two-capacitor (6T2C) structure, a seven-transistor-two-capacitor (7T2C) structure, or any possible structure. The micro-light emitting element L1 is, for example, a flip-chip micro-light emitting diode (LED), a horizontal micro-LED, a vertical micro-LED, or an organic micro-LED, and the micro-light emitting element L1 has a size of, for example, smaller than 100 microns, preferably smaller than 50 microns. On the other hand, the micro light emitting element L1 is, for example, a red LED, a green LED, a blue LED, or an LED of any other color. The switching element 111 and the switching element 112 may be any bottom-gate thin film transistors, any top-gate thin film transistors, or any other suitable thin film transistors well-known to persons of ordinary skill in the art. Moreover, the structure of the thin film transistors may be understood with reference to the description relating to any of the aforesaid switch elements (i.e., the switch elements SW1 to SW4), wherein the switching element 111 includes a source 111a, a drain 111b and a gate 111c, the switching element 112 includes a source 112a, a drain 112b and a gate 112c, and the description of the channel layer (not denoted) can be found above and will not be repeated herein.

For example, the gate 112c of the switching element 112 is electrically connected to one scan line (e.g., the scan line SL1 or the scan line SL2) of the scan line set SG1, and the source 112a of the switching element 112 is electrically connected to the line section N. The drain 111b of the switching element 111 is electrically connected to a high-level voltage source Vdd, an electrode 113a of the capacitor 113 is electrically connected to the gate 111c of the switching element 111 and the drain 112b of the switching element 112, an electrode 113b of the capacitor 113 is electrically connected to the source 111a of the switching element 111 and one end of the micro-light emitting element L1, and the other end of the micro-light emitting element L1 is electrically connected to a low-level voltage source Vss. However, the disclosure is not limited thereto.

Figure 2B:
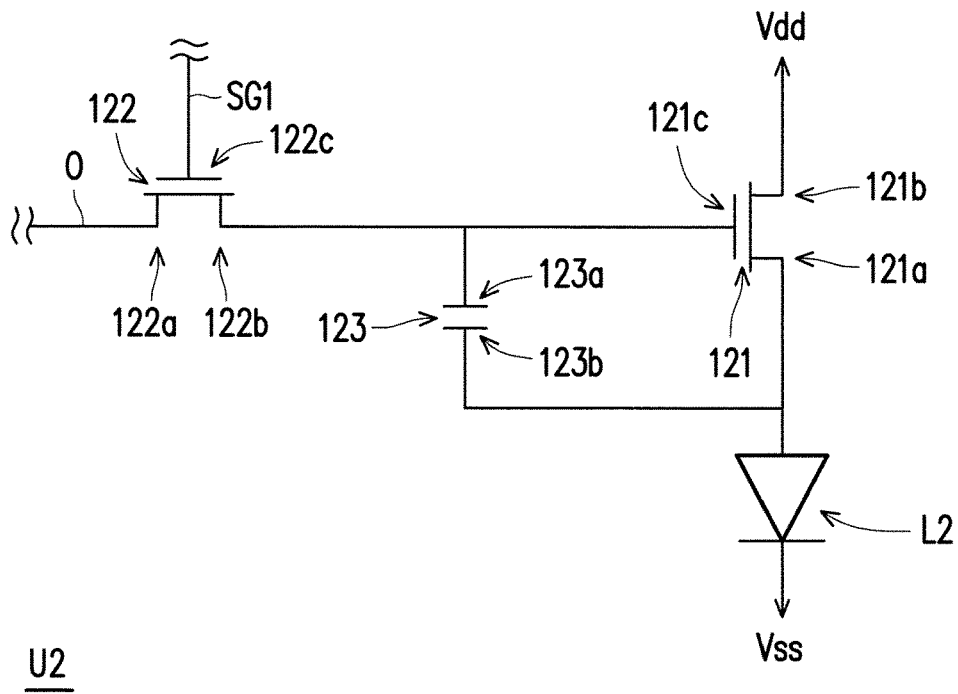

Referring to FIG. 1 and FIG. 2B together, at least one pixel unit U2 may include a switching element 121, a switching element 122 and a micro-light emitting element L2, wherein the switching elements 121 and 122 are electrically connected to the micro-light emitting element L2. In addition, at least one pixel unit U2 further includes a capacitor 123, wherein the capacitor 123 is electrically connected to the switching element 121, the switching element 122 and the micro-light emitting element L2. In the present embodiment, description is given of an example in which at least one pixel unit U2 is of a 2T1C structure. However, the disclosure is not limited thereto. In the disclosure, the numbers of switching elements (abbreviated as T) and capacitors (abbreviated as C) in each pixel unit U2 are not limited. In other embodiments, each pixel unit U2 may be of a 1T1C structure, a 3T1C structure, a 3T2C structure, a 4T1C structure, a 4T2C structure, a 5T1C structure, a 5T2C structure, a 6T1C structure, a 6T2C structure, a 7T2C structure, or any possible structure.

The micro-light emitting element L2 is, for example, a flip-chip micro-LED, a horizontal micro-LED, a vertical micro-LED, or an organic micro-LED, and the micro-light emitting element L2 has a size of, for example, smaller than 100 microns, preferably smaller than 50 microns. On the other hand, the micro light emitting element L2 is, for example, a red LED, a green LED, a blue LED, or an LED of any other color. The switching elements 121 and 122 may be any bottom-gate thin film transistors, any top-gate thin film transistors, or any other suitable thin film transistors well-known to persons of ordinary skill in the art. Moreover, the structure of the thin film transistors may be understood with reference to the description relating to any of the aforesaid switch elements (i.e., the switch elements SW1 to SW4), wherein the switching element 121 includes a source 121a, a drain 121b and a gate 121c, the switching element 122 includes a source 122a, a drain 122b and a gate 122c, and the description of the channel layer (not denoted) can be found above and will not be repeated herein.

For example, the gate 122c of the switching element 122 is electrically connected to one scan line (e.g., the scan line SL1 or SL2) of the scan line set SG1, and the source 122a of the switching element 122 is electrically connected to the line section O. The drain 121b of the switching element 121 is electrically connected to the high-level voltage source Vdd, an electrode 123a of the capacitor 123 is electrically connected to the gate 121c of the switching element 121 and the drain 122b of the switching element 122, an electrode 123b of the capacitor 123 is electrically connected to the source 121a of the switching element 121 and one end of the-micro light emitting element L2, and the other end of the micro-light emitting element L2 is electrically connected to the low-level voltage source Vss. However, the disclosure is not limited thereto.

Figure 2C:
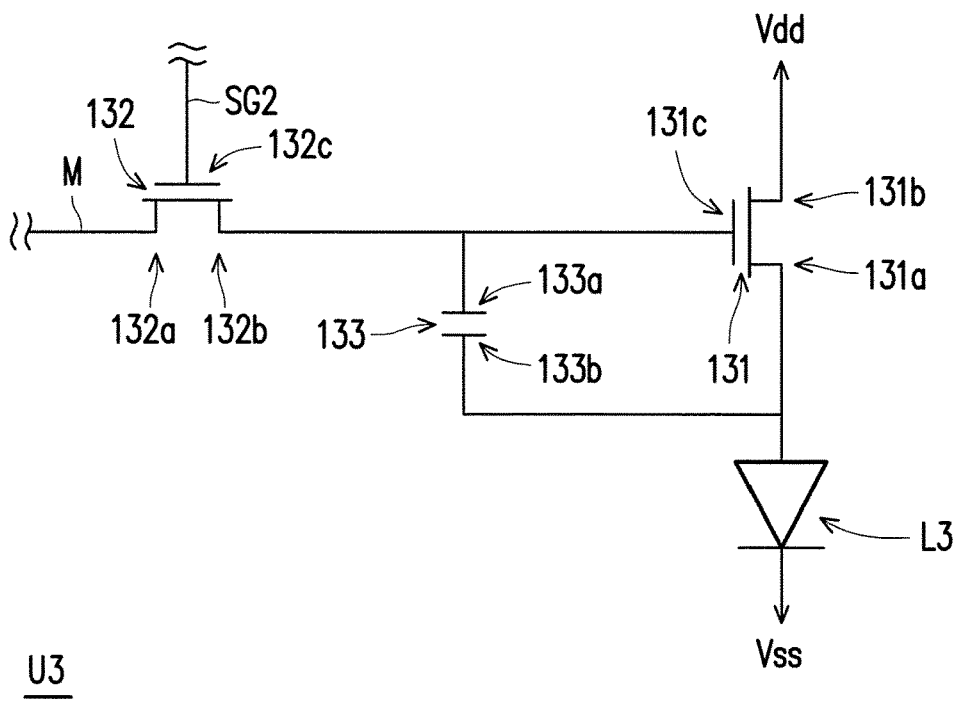

Referring to FIG. 1 and FIG. 2C together, at least one pixel unit U3 may include a switching element 131, a switching element 132 and a micro light emitting element L3, wherein the switching elements 131 and 132 are electrically connected to the micro-light emitting element L3. In addition, at least one pixel unit U3 further includes a capacitor 133, wherein the capacitor 133 is electrically connected to the switching element 131, the switching element 132 and the micro-light emitting element L3. In the present embodiment, description is given of an example in which at least one pixel unit U3 is of a 2T1C structure. However, the disclosure is not limited thereto. In the disclosure, the numbers of switching elements (abbreviated as T) and capacitors (abbreviated as C) in each pixel unit U3 are not limited. In other embodiments, each pixel unit U3 may be of a 1T1C structure, a 3T1C structure, a 3T2C structure, a 4T1C structure, a 4T2C structure, a 5T1C structure, a 5T2C structure, a 6T1C structure, a 6T2C structure, a 7T2C structure, or any possible structure.

The micro-light emitting element L3 is, for example, a flip-chip micro-LED, a horizontal micro-LED, a vertical micro-LED, or an organic micro-LED, and the micro-light emitting element L3 has a size of, for example, smaller than 100 microns, preferably smaller than 50 microns. On the other hand, the micro-light emitting element L3 is, for example, a red LED, a green LED, a blue LED, or an LED of any other color. The switching elements 131 and 132 may be any bottom-gate thin film transistors, any top-gate thin film transistors, or any other suitable thin film transistors well-known to persons of ordinary skill in the art. Moreover, the structure of the thin film transistors may be understood with reference to the description relating to any of the aforesaid switch elements (i.e., the switch elements SW1 to SW4), wherein the switching element 131 includes a source 131a, a drain 131b and a gate 131c, the switching element 132 includes a source 132a, a drain 132b and a gate 132c, and the description of the channel layer (not denoted) can be found above and will not be repeated herein.

For example, the gate 132c of the switching element 132 is electrically connected to one scan line (e.g., the scan line SL5, SL6, SL7 or SL8) of the scan line set SG2, and the source 132a of the switching element 132 is electrically connected to the main line section M. The drain 131b of the switching element 131 is electrically connected to the high-level voltage source Vdd, an electrode 133a of the capacitor 133 is electrically connected to the gate 131c of the switching element 131 and the drain 132b of the switching element 132, an electrode 133b of the capacitor 133 is electrically connected to the source 131a of the switching element 131 and one end of the micro-light emitting element L3, and the other end of the micro-light emitting element L3 is electrically connected to the low-level voltage source Vss. However, the disclosure is not limited thereto.

Figure 2D:
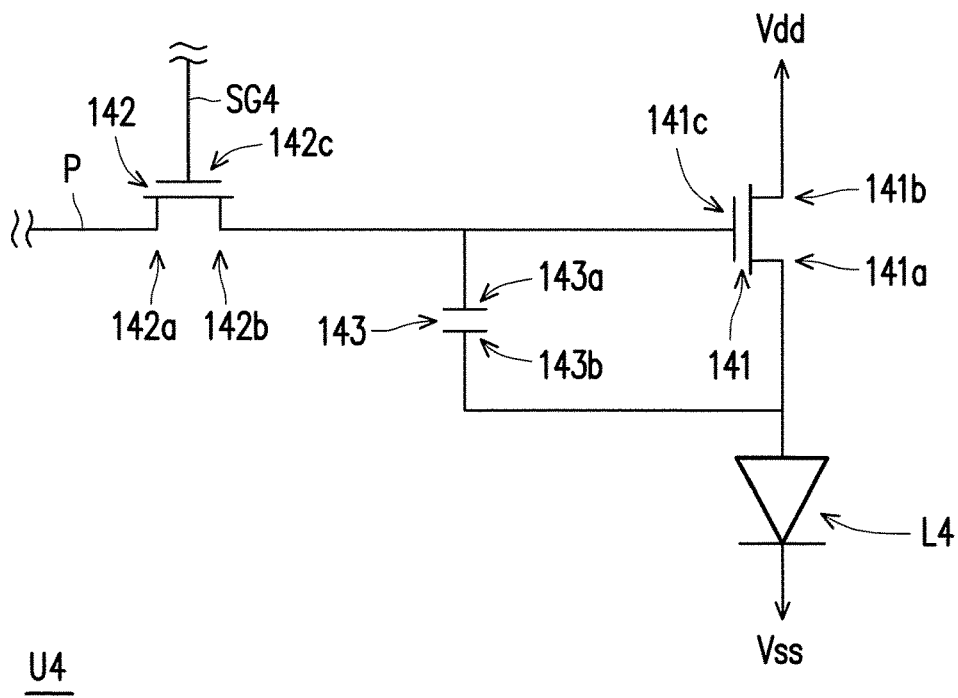

Referring to FIG. 1 and FIG. 2D together, at least one pixel unit U4 may include a switching element 141, a switching element 142 and a micro-light emitting element L4, wherein the switching elements 141 and 142 are electrically connected to the micro-light emitting element L4. In addition, at least one pixel unit U4 further includes a capacitor 143, wherein the capacitor 143 is electrically connected to the switching element 141, the switching element 142 and the micro-light emitting element L4. In the present embodiment, description is given of an example in which at least one pixel unit U4 is of a 2T1C structure. However, the disclosure is not limited thereto. In the disclosure, the numbers of switching elements (abbreviated as T) and capacitors (abbreviated as C) in each pixel unit U4 are not limited. In other embodiments, each pixel unit U4 may be of a 1T1C structure, a 3T1C structure, a 3T2C structure, a 4T1C structure, a 4T2C structure, a 5T1C structure, a 5T2C structure, a 6T1C structure, a 6T2C structure, a 7T2C structure, or any possible structure.

The micro light emitting element L4 is, for example, a flip-chip micro-LED, a horizontal micro-LED, a vertical micro-LED, or an organic micro-LED, and the micro-light emitting element L4 has a size of, for example, smaller than 100 microns, preferably smaller than 50 microns. On the other hand, the micro-light emitting element L4 is, for example, a red LED, a green LED, a blue LED, or an LED of any other color. The switching elements 141 and 142 may be any bottom-gate thin film transistors, any top-gate thin film transistors, or any other suitable thin film transistors well-known to persons of ordinary skill in the art. Moreover, the structure of the thin film transistors may be understood with reference to the description relating to any of the aforesaid switch elements (i.e., the switch elements SW1 to SW4), wherein the switching element 141 includes a source 141a, a drain 141b and a gate 141c, the switching element 142 includes a source 142a, a drain 142b and a gate 142c, and the description of the channel layer (not denoted) can be found above and will not be repeated herein.

For example, the gate 142c of the switching element 142 is electrically connected to one scan line (e.g., the scan line SL11 or SL12) of the scan line set SG4, and the source 142a of the switching element 142 is electrically connected to the line section P. The drain 141b of the switching element 141 is electrically connected to the high-level voltage source Vdd, an electrode 143a of the capacitor 143 is electrically connected to the gate 141c of the switching element 141 and the drain 142b of the switching element 142, an electrode 143b of the capacitor 143 is electrically connected to the source 141a of the switching element 141 and one end of the micro-light emitting element L4, and the other end of the micro-light emitting element L4 is electrically connected to the low-level voltage source Vss. However, the disclosure is not limited thereto.

Figure 2E:
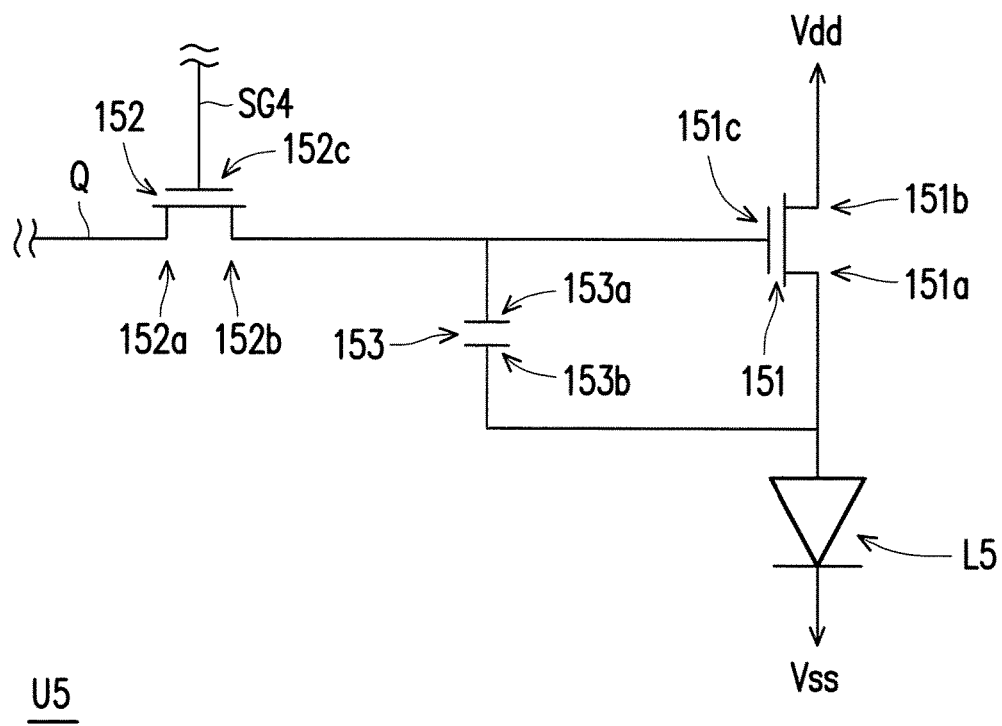

Referring to FIG. 1 and FIG. 2E together, at least one pixel unit U5 may include a switching element 151, a switching element 152 and a micro-light emitting element L5, wherein the switching elements 151 and 152 are electrically connected to the micro-light emitting element L5. In addition, at least one pixel unit U5 further includes a capacitor 153, wherein the capacitor 153 is electrically connected to the switching element 151, the switching element 152 and the micro-light emitting element L5. In the present embodiment, description is given of an example in which at least one pixel unit U5 is of a 2T1C structure. However, the disclosure is not limited thereto. In the disclosure, the numbers of switching elements (abbreviated as T) and capacitors (abbreviated as C) in each pixel unit U5 are not limited. In other embodiments, each pixel unit U5 may be of a 1T1C structure, a 3T1C structure, a 3T2C structure, a 4T1C structure, a 4T2C structure, a 5T1C structure, a 5T2C structure, a 6T1C structure, a 6T2C structure, a 7T2C structure, or any possible structure.

The micro-light emitting element L5 is, for example, a flip-chip micro-LED, a horizontal micro-LED, a vertical micro-LED, or an organic micro-LED, and the micro-light emitting element L5 has a size of, for example, smaller than 100 microns, preferably smaller than 50 microns. On the other hand, the micro-light emitting element L5 is, for example, a red LED, a green LED, a blue LED, or an LED of any other color. The switching elements 151 and 152 may be any bottom-gate thin film transistors, any top-gate thin film transistors, or any other suitable thin film transistors well-known to persons of ordinary skill in the art. Moreover, the structure of the thin film transistors may be understood with reference to the description relating to any of the aforesaid switch elements (i.e., the switch elements SW1 to SW4), wherein the switching element 151 includes a source 151a, a drain 151b and a gate 151c, the switching element 152 includes a source 152a, a drain 152b and a gate 152c, and the description of the channel layer (not denoted) can be found above and will not be repeated herein.

For example, the gate 152c of the switching element 152 is electrically connected to one scan line (e.g., the scan line SL11 or SL12) of the scan line set SG4, and the source 152a of the switching element 152 is electrically connected to the line section Q. The drain 151b of the switching element 151 is electrically connected to the high-level voltage source Vdd, an electrode 153a of the capacitor 153 is electrically connected to the gate 151c of the switching element 151 and the drain 152b of the switching element 152, an electrode 153b of the capacitor 153 is electrically connected to the source 151a of the switching element 151 and one end of the micro-light emitting element L5, and the other end of the micro-light emitting element L5 is electrically connected to the low-level voltage source Vss. However, the disclosure is not limited thereto.

In the present embodiment, the switching element 111 or 112 in at least one pixel unit U1 is electrically connected to the line section N and one scan line of the scan line set SG1 in the corresponding crossing section R1, the switching element 121 or 122 in at least one pixel unit U2 is electrically connected to the line section O and one scan line of the scan line set SG1 in the corresponding crossing section R2, the switching element 131 or 132 in at least one pixel unit U3 is electrically connected to the main line section M and one scan line of the scan line set SG2 in the corresponding crossing section R3, the switching element 141 or 142 in at least one pixel unit U4 is electrically connected to the line section P and one scan line of the scan line set SG4 in the corresponding crossing section R4, and the switching element 151 or 152 in at least one pixel unit U5 is electrically connected to the line section Q and one scan line of the scan line set SG4 in the corresponding crossing section R5.

In the present embodiment, the scan line SL1 or the scan line SL2 of the scan line set SG1 may be electrically connected to at least one pixel unit U1 and at least one pixel unit U2, the scan line SL11 or the scan line SL12 of the scan line set SG4 may be electrically connected to at least one pixel unit U4 and at least one pixel unit U5, and the scan line SL5, the scan line SL6, the scan line SL7 or the scan line SL8 of the scan line set SG2 may only be electrically connected to at least one pixel unit U3. In the present embodiment, it can be known by calculation that the number of the pixel units electrically connected to one scan line of the scan line set SG1 is greater than the number of the pixel units electrically connected to one scan line of the scan line set SG2. In some embodiments, it can be known by calculation that the number of the pixel units electrically connected to one scan line of the scan line set SG4 is greater than the number of the pixel units electrically connected to one scan line of the scan line set SG2.

One scan line of the scan line set SG1 and one scan line of the scan line set SG4 are both electrically connected to more pixel units than one scan line of the scan line set SG2. Thus, when the substrate 100 of the display device 10 (e.g., a non-planar or irregular (or specially-shaped) display device) has, for example, a diabolo shape, by causing the scan line sets SG1 and SG4 to correspond respectively to two end portions of the substrate 100 which have a greater perimeter and causing the scan line set SG2 to correspond to substantially center or center portion of the substrate 100 which has a smaller perimeter, the pixel units U1 to U5 can be more uniformly distributed in the display device 10, thus enabling the display device 10 to achieve better uniformity in a display image.

In the present embodiment, the line width W1 of the scan line SL1 and the line width W2 of the scan line SL2 of the scan line set SG1 may be greater than the line width W5 of the scan line SL5, the line width W6 of the scan line SL6, the line width W7 of the scan line SL7 and the line width W8 of the scan line SL8 of the scan line set SG2. As mentioned above, one scan line of the scan line set SG1 is electrically connected to more micro-light emitting elements than one scan line of the scan line set SG2. Thus, in the case that one scan line of the scan line set SG1 has a greater line width than one scan line of the scan line set SG2, the uniformity of resistance-capacitance (RC) loading of the display device 10 (e.g., a non-planar or irregular (or specially-shaped) display device) can be improved. In some embodiments, the line width W11 of the scan line SL11 and the line width W12 of the scan line SL12 of the scan line set SG4 may be greater than the line width W5 of the scan line SL5, the line width W6 of the scan line SL6, the line width W7 of the scan line SL7 and the line width W8 of the scan line SL8 of the scan line set SG2. Similarly, as mentioned above, one scan line of the scan line set SG4 is electrically connected to more micro-light emitting elements than one scan line of the scan line set SG2. Thus, in the case that one scan line of the scan line set SG4 has a greater line width than one scan line of the scan line set SG2, the uniformity of RC loading of the display device 10 (e.g., a non-planar or irregular (or special-shaped) display device) can be improved.

Although FIG. 1 illustrates that the line width W1 of the scan line SL1, the line width W2 of the scan line SL2, the line width W11 of the scan line SL11 and the line width W12 of the scan line SL12 are greater than the line width W5 of the scan line SL5, the line width W6 of the scan line SL6, the line width W7 of the scan line SL7 and the line width W8 of the scan line SL8, the disclosure is not limited thereto. In other embodiments, the line width W1 of the scan line SL1, the line width W2 of the scan line SL2, the line width W11 of the scan line SL11 and the line width W12 of the scan line SL12 may be substantially equal to the line width W5 of the scan line SL5, the line width W6 of the scan line SL6, the line width W7 of the scan line SL7 and the line width W8 of the scan line SL8, or one of the line width W1 of the scan line SL1 and the line width W2 of the scan line SL2 and one of the line width W11 of the scan line SL11 and the line width W12 of the scan line SL12 are greater than one of the line width W5 of the scan line SL5, the line width W6 of the scan line SL6, the line width W7 of the scan line SL7 and the line width W8 of the scan line SL8.

In the present embodiment, the micro-light emitting elements L1 in at least two pixel units U1 may emit light of essentially (or substantially) the same color, the micro-light emitting elements L2 in at least two pixel units U2 may emit light of essentially the same color, and the color of the light emitted by the micro-light emitting element L1 in the pixel unit U1 is different from the color of the light emitted by the micro-light emitting element L2 in the pixel unit U2. For example, in one embodiment, the micro-light emitting element L1 in the pixel unit U1 may be a red LED, and the micro-light emitting element L2 in the pixel unit U2 may be a green LED, but not limited its.

Similarly, in the present embodiment, the micro-light emitting elements L4 in at least two pixel units U4 may emit light of essentially the same color, the micro-light emitting elements L5 in at least two pixel units U5 may emit light of essentially the same color, and the color of the light emitted by the micro-light emitting element L4 in the pixel unit U4 is different from the color of the light emitted by the micro-light emitting element L5 in the pixel unit U5. For example, in one embodiment, the micro-light emitting element L4 in the pixel unit U4 may be a red LED, and the micro-light emitting element L5 in the pixel unit U5 may be a green LED, but not limited its.

In addition, in the present embodiment, a plurality of micro-light emitting elements L3 in a plurality of pixel units U3 may emit light of colors essentially not completely the same, light of essentially different colors, or light of essentially the same color. For example, in one embodiment, the micro-light emitting element L3 in the pixel unit U3 that is electrically connected to the scan line SL5 may be a green LED, the micro-light emitting element L3 in the pixel unit U3 that is electrically connected to the scan line SL6 may be a red LED, the micro-light emitting element L3 in the pixel unit U3 that is electrically connected to the scan line SL7 may be a green LED, and the micro-light emitting element L3 in the pixel unit U3 that is electrically connected to the scan line SL8 may be a red LED, but not limited its. For another example, in one embodiment, the micro-light emitting element L3 in the pixel unit U3 that is electrically connected to the scan line SL5 may be a green LED, the micro-light emitting element L3 in the pixel unit U3 that is electrically connected to the scan line SL6 may be a red LED, the micro-light emitting element L3 in the pixel unit U3 that is electrically connected to the scan line SL7 may be a blue LED, and the micro-light emitting element L3 in the pixel unit U3 that is electrically connected to the scan line SL8 may be a yellow LED, but not limited its. For still another example, in one embodiment, the micro-light emitting element L3 in the pixel unit U3 may be a green LED, but not limited its.

In the present embodiment, as shown in FIG. 1, none of the switch element SW1, the switch element SW2, the switch element SW3 and the switch element SW4 is connected to the pixel unit U1, the pixel unit U2, the pixel unit U3, the pixel unit U4 and the pixel unit U5. For example, in the present embodiment, the switch elements SW1, SW2, SW3 and SW4 are configured to transmit a data signal through the data line DL1 rather than to drive the micro-light emitting elements L1 to L5 to emit light.

In the present embodiment, a distance X3 between the scan line SL3 and the scan line SL4 of the scan line set SG3 is smaller than a distance X1 between the scan line SL1 and the scan line SL2 of the scan line set SG1, and the distance X3 between the scan line SL3 and the scan line SL4 of the scan line set SG3 is smaller than a distance X2 between the scan line SL5 and the scan line SL6, between the scan line SL6 and the scan line SL7, and between the scan line SL7 and the scan line SL8 of the scan line set SG2. For example, in the present embodiment, the distance between any two adjacent scan lines of the scan line set SG1 and the distance between any two adjacent scan lines of the scan line set SG2 are both greater than the distance between any two adjacent scan lines of the scan line set SG3. In some embodiments, a distance X5 between the scan line SL9 and the scan line SL10 of the scan line set SG5 is smaller than a distance X4 between the scan line SL11 and the scan line SL12 of the scan line set SG4, and the distance X5 between the scan line SL9 and the scan line SL10 of the scan line set SG5 is smaller than the distance X2 between the scan line SL5 and the scan line SL6, between the scan line SL6 and the scan line SL7, and between the scan line SL7 and the scan line SL8 of the scan line set SG2. For example, in the present embodiment, the distance between any two adjacent scan lines of the scan line set SG4 and the distance between any two adjacent scan lines of the scan line set SG2 are both greater than the distance between any two adjacent scan lines of the scan line set SG5.

As mentioned above, no switch element (e.g., the switch elements SW1 to SW4) is connected to the pixel unit (e.g., the pixel units U1 to U5). Thus, in the case that the distance X3 between the scan line SL3 and the scan line SL4 configured to control the switch elements SW1 and SW2 and/or the distance X5 between the scan line SL9 and the scan line SL10 configured to control the switch elements SW3 and SW4 are smaller than the distance X1 between any two adjacent scan lines of the scan line set SG1 in contact with the pixel units U1 and U2, the distance X2 between any two adjacent scan lines of the scan line set SG2 in contact with the pixel unit U3, and the distance X4 between any two adjacent scan lines of the scan line set SG4 in contact with the pixel units U4 and U5, the spatial utilization of the display device 10 (e.g., a non-planar or irregular (or specially-shaped) display device) can be improved.

In the present embodiment, under substantially the same grayscale display, brightness of the micro-light emitting element L3 of at least one of the pixel units U3 is lower than brightness of the micro-light emitting element L1 of at least one of the pixel units U1, and the brightness of the micro-light emitting element L3 of at least one of the pixel units U3 is lower than brightness of the micro-light emitting element L2 of at least one of the pixel units U2. In some embodiments, under substantially the same grayscale display, the brightness of the micro-light emitting element L3 of at least one of the pixel units U3 is lower than brightness of the micro-light emitting element L4 of at least one of the pixel units U4, and the brightness of the micro-light emitting element L3 of at least one of the pixel units U3 is lower than brightness of the micro-light emitting element L5 of at least one of the pixel units U5. For example, under substantially the same grayscale display, in the present embodiment, brightness of at least one of the pixel units U3 connected to the main line section M may be lower than brightness of at least one of the pixel units U1 connected to the line section N, brightness of at least one of the pixel units U2 connected to the line section O, brightness of at least one of the pixel units U4 connected to the line section P and brightness of at least one of the pixel units U5 connected to the line section Q.

In one embodiment, by causing a ratio between channel width and channel length of the switching element 131 and/or the switching element 132 of at least one of the pixel units U3 to be smaller than a ratio between channel width and channel length of the switching element 111 and/or the switching element 112 of at least one of the pixel units U1, a ratio between channel width and channel length of the switching element 121 and/or the switching element 122 of at least one of the pixel units U2, a ratio between channel width and channel length of the switching element 141 and/or the switching element 142 of at least one of the pixel units U4, and a ratio between channel width and channel length of the switching element 151 and/or the switching element 152 of at least one of the pixel units U5, the aforesaid brightness relationships between the pixel units (e.g., the pixel units U1 to U5) of the display device 10 (e.g., a non-planar or irregular (or specially-shaped) display device) can be achieved.

In another embodiment, by causing turn-on time of the switching element 131 and/or the switching element 132 of at least one of the pixel units U3 to be shorter than turn-on time of the switching element 111 and/or the switching element 112 of at least one of the pixel units U1, turn-on time of the switching element 121 and/or the switching element 122 of at least one of the pixel units U2, turn-on time of the switching element 141 and/or the switching element 142 of at least one of the pixel units U4, and turn-on time of the switching element 151 and/or the switching element 152 of at least one of the pixel units U5, the aforesaid brightness relationships between the pixel units (e.g., the pixel units U1 to U5) of the display device 10 (e.g., a non-planar or irregular (or specially-shaped) display device) can be achieved.

In another embodiment, by causing a driving voltage of the switching element 131 and/or the switching element 132 of at least one of the pixel units U3 to be less than a driving voltage of the switching element 111 and/or the switching element 112 of at least one of the pixel units U1, a driving voltage of the switching element 121 and/or the switching element 122 of at least one of the pixel units U2, a driving voltage of the switching element 141 and/or the switching element 142 of at least one of the pixel units U4, and a driving voltage of the switching element 151 and/or the switching element 152 of at least one of the pixel units U5, the aforesaid brightness relationships between the pixel units (e.g., the pixel units U1 to U5) of the display device 10 (e.g., a non-planar or irregular (or special-shaped) display device) can be achieved.

In another embodiment, by causing a light emitting voltage of the micro-light emitting element L3 of at least one of the pixel units U3 to be less than a light emitting voltage of the micro-light emitting element L1 of at least one of the pixel units U1, a light emitting voltage of the micro-light emitting element L2 of at least one of the pixel units U2, a light emitting voltage of the micro-light emitting element L4 of at least one of the pixel units U4, and a light emitting voltage of the micro-light emitting element L5 of at least one of the pixel units U5, the aforesaid brightness relationships between the pixel units (e.g., the pixel units U1 to U5) of the display device 10 (e.g., a non-planar or irregular (or specially-shaped) display device) can be achieved.

As mentioned above, in the display device 10 (e.g., a non-planar or irregular (or specially-shaped) display device), the data line DL1 includes the main line section M the line section N, the line section O, the line section P and the line section Q, wherein the line section N interlaces with or crosses over the scan line set SG1 to form the crossing section R1, the line section O interlaces with or crosses over the scan line set SG1 to form the crossing section R2, the main line section M interlaces with or crosses over the scan line set SG2 to form the crossing section R3, the line section P interlaces with or crosses over the scan line set SG4 to form the crossing section R4, the line section Q interlaces with or crosses over the scan line set SG4 to form the crossing section R5, the line section N is electrically connected to the main line section M and the scan line SL3 via the switch element SW1, the line section O is electrically connected to the main line section M and the scan line SL4 via the switch element SW2, the line section P is electrically connected to the main line section M and the scan line SL9 via the switch element SW3, the line section Q is electrically connected to the main line section M and the scan line SL10 via the switch element SW4, and the pixel unit U1, the pixel unit U2, the pixel unit U3, the pixel unit U4 and the pixel unit U5 are disposed corresponding to the crossing section R1, the crossing section R2, the crossing section R3, the crossing section R4 and the crossing section R5, respectively. Accordingly, in the case where the substrate 100 is a non-planar or irregular (or specially-shaped) substrate, the pixel units U1 to U5 can be more uniformly distributed in the display device 10, namely a non-planar or irregular (or specially-shaped) display device. In this way, when the display device 10 performs display, better uniformity in the display image can be maintained.

Figure 3:
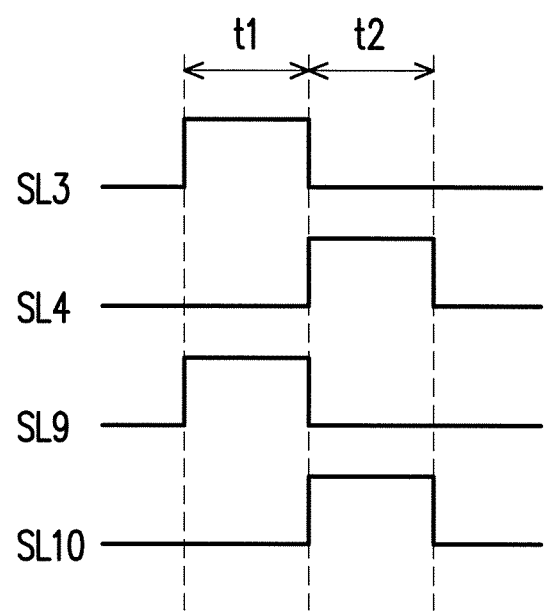
FIG. 3 is a schematic view of waveforms of a scan line SL3, a scan line SL4, a scan line SL9 and a scan line SL10 in FIG. 1.

In a display mode, the display device 10 (e.g., a non-planar or irregular (or specially-shaped) display device) may perform display by a time division technique. Hereinafter, a control method of the display device 10 will be further described with reference to FIG. 3. FIG. 3 is a schematic view of waveforms of the scan line SL3, the scan line SL4, the scan line SL9 and the scan line SL10 in FIG. 1.

Referring to FIG. 3 and FIG. 1 together, during a frame time t1 (or namely when in a first time t1), a turn-on signal is input respectively to the scan line SL3 and the scan line SL9 to turn on the switch element SW1 and the switch element SW3, without being input to the scan line SL4 and the scan line SL10. At this moment, the switch element SW2 and the scan line SW4 are not turned on, and a data signal (or namely first data signal) transmitted by the line section N is transmitted to the main line section M via the turned-on switch element SW1, and then transmitted to the line section P via the turned-on switch element SW3. During a frame time t2 (or namely when in a second time t1), a turn-on signal is input respectively to the scan line SL4 and the scan line SL10 to turn on the switch element SW2 and the switch element SW4, without being input to the scan line SL3 and the scan line SL9. At this moment, the switch element SW1 and the switch element SW3 are not turned on, and a data signal (or namy second data signal) transmitted by the line section O is transmitted to the main line section M via the turned-on switch element SW2, and then transmitted to the line section Q via the turned-on switch element SW4. In other embodiments, during a different frame time t1 or t2, signals may be transmitted from the line section P and the line section Q respectively to the main line section M and then to the line section N and the line section O respectively, and the other connection relationships may be understood with reference to the above description. In this way, during the frame time t1, the pixel unit U1, the pixel unit U3 and the pixel unit U4 display a display image; during the frame time t2, the pixel unit U2, the pixel unit U3 and the pixel unit U5 display a display image.

In the present embodiment, by using the micro light emitting elements L1 to L5 having fast response time and high operation frequency, a drive scanning rate of the display device 10 (e.g., a non-planar or irregular (or specially-shaped) display device) is, for example, greater than or equal to about 120 Hz. In this way, after the frame time t1 and the frame time t2 have elapsed, when an observer views an image displayed by the display device 10, they do not feel any interruption or flicker in the image due to persistence of vision of the human eye. Thus, the effect of improving uniformity in the display image is achieved.

In addition, as mentioned above, the pixel unit U3 displays a display image during both the frame time t1 and the frame time t2. Thus, by causing the brightness of at least one of the pixel units U3 to be lower than the brightness of at least one of the pixel units U1, the brightness of at least one of the pixel units U2, the brightness of at least one of the pixel units U4 and the brightness of at least one of the pixel units U5, the image output by the same signal and displayed by the display device 10 (e.g., a non-planar or irregular (or specially-shaped) display device) after the frame time t1 and the frame time t2 becomes more uniform in brightness when viewed by the observer.

In addition, although FIG. 2A, FIG. 2B, FIG. 2D and FIG. 2E illustrate that the pixel unit U1, the pixel unit U2, the pixel unit U4 and the pixel unit U5 each include one micro-light emitting element (e.g., the micro-light emitting elements L1, L2, L4 and L5), the disclosure is not limited thereto. In other embodiments, at least one of at least one pixel unit U1, at least one pixel unit U2, at least one pixel unit U4 and at least one pixel unit U5 may each include a plurality of micro-light emitting elements (e.g., the micro-light emitting elements L1, L2, L4 and L5) of substantially the same color, but not limited its.

Although FIG. 2C illustrates that at least one pixel unit U3 includes one micro-light emitting element L3, the disclosure is not limited thereto. In other embodiments, at least one pixel unit U3 may include a plurality of micro-light emitting elements L3 of substantially the same color or a plurality of micro-light emitting elements L3 of different colors. When at least one pixel unit U3 includes a plurality of micro-light emitting elements L3 of different colors, the plurality of micro-light emitting elements L3 are independently driven. That is, although the plurality of micro-light emitting elements L3 are driven by the same scan line, the micro-light emitting elements L3 can be controlled by different switching elements.

Although FIG. 1 illustrates that one end of the main line section M includes two branches m1 and m2 and the other end of the main line section M also includes two branches m3 and m4, the disclosure is not limited thereto. In other embodiments, in the case where one end of the main line section M includes two branches m1 and m2, the other end of the main line section M may include three or more branches; or in the case where the other end of the main line section M includes two branches m3 and m4, one end of the main line section M may include three or more branches; or both two ends of the main line section M may include three or more branches. Based on the above description of the embodiment of FIG. 1, persons of ordinary skill in the art should understand that the number of line sections of the data line, the number of switch elements and the number of the scan lines electrically connected to the switch elements are all adjustable according to the number of branches of the main line section M.

Although FIG. 1 illustrates that the data line DL1 includes the main line section M interlacing with or crossing over the scan line set SG2, the line section N and the line section O interlacing with or crossing over the scan line set SG1, and the line section P and the line section Q interlacing with or crossing over the scan line set SG4 for exemplary purposes, the disclosure is not limited thereto.

In other embodiments, the data line DL1 may only include the main line section M interlacing with or crossing over the scan line set SG2 and the line section N and the line section O interlacing with or crossing over the scan line set SG1. In the embodiment in which the data line DL1 only includes the main line section M, the line section N and the line section O, the substrate 100 has, for example, an inverted triangular conical shape. Moreover, it is worth noting that, in the embodiment in which the data line DL1 only includes the main line section M, the line section N and the line section O, the line section N interlaces with or crosses over the scan line set SG1 to faun the crossing section R1, the line section O interlaces with or crosses over the scan line set SG1 to form the crossing section R2, the main line section M interlaces with or crosses over the scan line set SG2 to form the crossing section R3, the line section N is electrically connected to the main line section M and the scan line SL3 via the switch element SW1, the line section O is electrically connected to the main line section M and the scan line SL4 via the switch element SW2, and the pixel unit U1, the pixel unit U2 and the pixel unit U3 are disposed corresponding to the crossing section R1, the crossing section R2 and the crossing section R3, respectively. Accordingly, in the case where the substrate 100 is a non-planar or irregular (or specially-shaped) substrate, the pixel units U1 to U3 can be more uniformly distributed in the display device 10, namely a non-planar or irregular (or specially-shaped) display device. In this way, when the display device 10 performs display, better uniformity in the display image can be maintained.

In other embodiments, the data line DL1 may only include the main line section M interlacing with or crossing over the scan line set SG2 and the line section P and the line section Q interlacing with or crossing over the scan line set SG4. In the embodiment in which the data line DL1 only includes the main line section M, the line section P and the line section Q, the substrate 100 has, for example, a triangular conical shape. Moreover, it is worth noting that, in the embodiment in which the data line DL1 only includes the main line section M, the line section P and the line section Q, the line section P interlaces with or crosses over the scan line set SG4 to form the crossing section R4, the line section Q interlaces with or crosses over the scan line set SG4 to form the crossing section R5, the main line section M interlaces with or crosses over the scan line set SG2 to form the crossing section R3, the line section P is electrically connected to the main line section M and the scan line SL9 via the switch element SW3, the line section Q is electrically connected to the main line section M and the scan line SL10 via the switch element SW4, and the pixel unit U4, the pixel unit U5 and the pixel unit U3 are disposed corresponding to the crossing section R4, the crossing section R5 and the crossing section R3, respectively. Accordingly, in the case where the substrate 100 is a non-planar or irregular (or specially-shaped) substrate, the pixel units U3 to U5 can be more uniformly distributed in the display device 10, namely a non-planar or irregular (or specially-shaped) display device. In this way, when the display device 10 performs display, better uniformity in the display image can be maintained.

Hence, in the display device 10 (e.g., a non-planar or irregular (or specially-shaped) display device) of the disclosure, the internal structure may be adjusted according to various shapes of the substrate so that better uniformity in the display image can be maintained when the display device 10 performs display. Therefore, the display device 10 of the disclosure is applicable to substrates of various shapes and allows excellent design flexibility in practical application.

Figure 4:
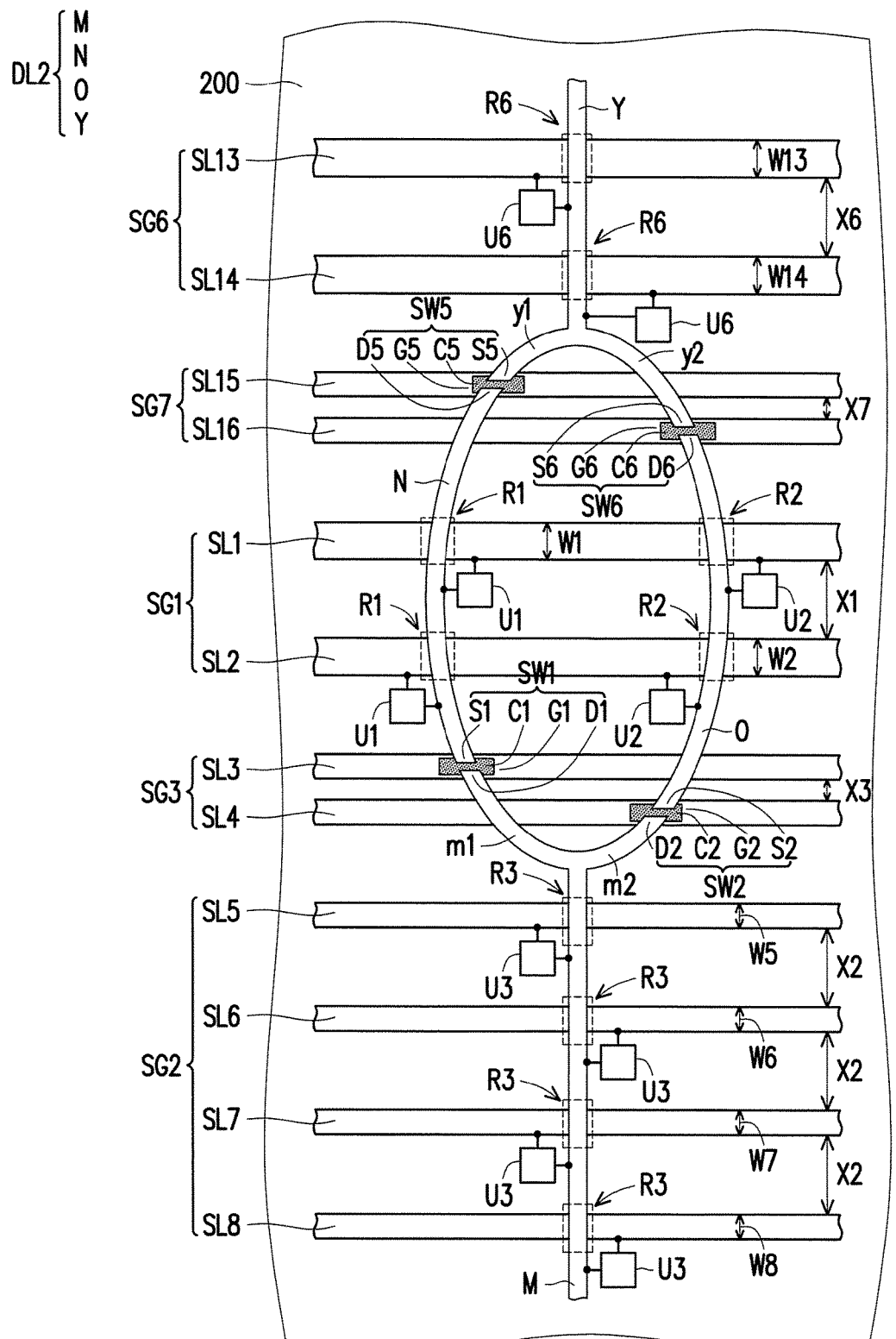
FIG. 4 is a schematic partial top view of a display device according to another embodiment of the disclosure.
Figure 5:
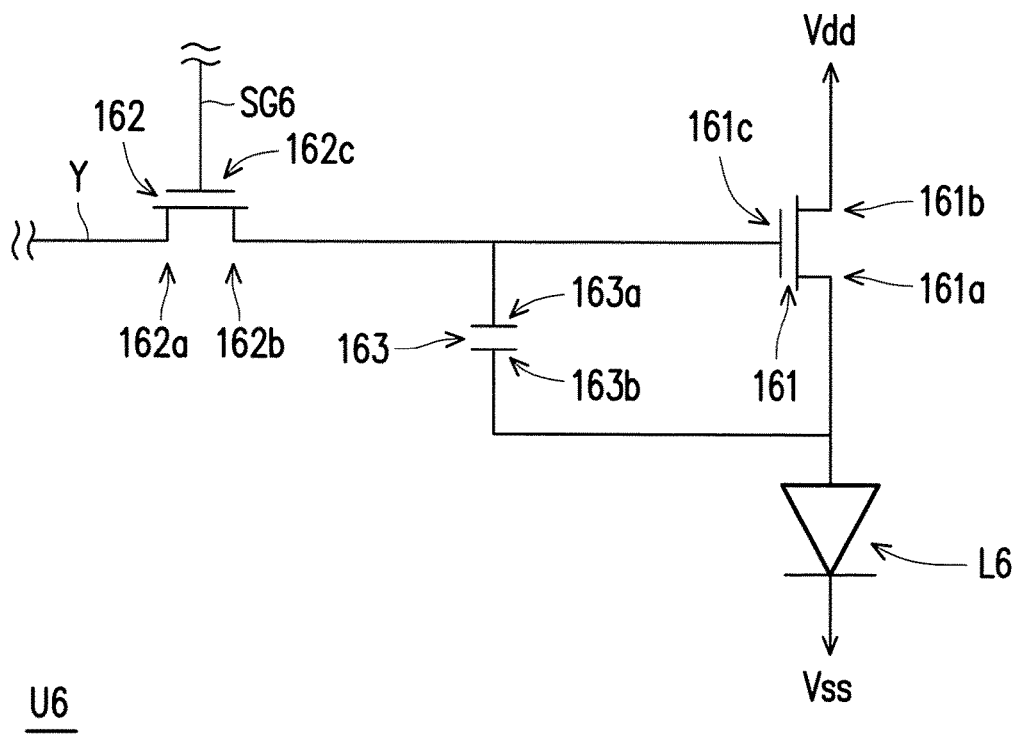
FIG. 5 is a circuit diagram of a pixel unit U6 in FIG. 4.

FIG. 4 is a schematic partial top view of a display device according to another embodiment of the disclosure. FIG. 5 is a circuit diagram of the pixel unit U6 in FIG. 4. Referring to FIG. 4 and FIG. 1 together, a display device 20 of FIG. 4 is similar to the display device 10 of FIG. 1. Hence the same or similar reference numerals denote the same or similar elements, and repeated description of the same technical content is omitted. For the description of the omitted parts, please refer to the aforesaid embodiment. The difference between these two display devices will be described below.

Referring to FIG. 4, the display device 20 may be applied in a non-planar display device, but is not limited thereto. In other embodiments, the display device 20 may be applied in an irregular (or specially-shaped) display device. In the present embodiment, the display device 20 may include a substrate 200, the plurality of scan lines SL1 to SL8, a plurality of scan lines SL13 to SL16, the switch element SW1, the switch element SW2, a data line DL2, the plurality of pixel units U1, the plurality of pixel units U2 and the plurality of pixel units U3. In some embodiments, the display device 20 may further include a switch element SW5, a switch element SW6 and a plurality of pixel units U6. To describe the design of the display device of the disclosure in detail, an example is given below in which one data line (i.e., the data line DL2) is provided. However, it should be understood by persons of ordinary skill in the art that the display device generally includes a plurality of data lines. Therefore, persons of ordinary skill in the art may understand the overall structure or layout of the display device 20 according to the following description of the partial display device 20 having one data line.

In the present embodiment, the substrate 200 may be, for example but not limited to, a non-planar substrate. In other embodiments, the substrate 200 may be an irregular (or specially-shaped) substrate. For example, if the substrate 200 is a non-planar substrate, the substrate 200 may be a three-dimensional substrate obtained by modeling a planar substrate or a three-dimensional substrate obtained by direct shaping. In one embodiment, the substrate 200 has, for example, a spherical shape, a rugby ball shape, a conical post shape or other suitable shape. For example, the substrate 200 may be a three-dimensional substrate having a concave-convex profile. The material of the substrate 200 may include the aforesaid material of the substrate 100, and the materials of these two substrates may be optionally substantially the same or different.

The scan lines SL1 to SL8 and SL13 to SL16 are arranged on the substrate 200. In the present embodiment, the scan lines SL13 to SL16 may have a scan line set (or namely scan line group) SG6 and a scan line set SG7, wherein the scan line set SG6 (or namely fourth scan line set) includes the scan line SL13 and the scan line SL14, and the scan line set SG7 (or namely fifth scan line set) includes the scan line SL15 and the scan line SL16. At least one of the scan lines SL13 to SL16 may have a single-layer or multilayer structure, and the material thereof may include the material of the aforesaid scan lines (e.g., the scan lines SL1 to SL8). The materials of these scan lines may be optionally substantially the same or different.

Although FIG. 4 illustrates that the scan line set SG6 includes two scan lines SL13 to SL14 for exemplary purposes, the disclosure is not limited thereto. In other embodiments, the number of scan lines of the scan line set SG6 may be adjusted according to the actual architecture and requirements of the display device 20 (e.g., a non-planar or irregular (or special-shaped) display device).

Although FIG. 4 illustrates that the scan line set SG7 includes two scan lines SL15 to SL16 for exemplary purposes, the disclosure is not limited thereto. In other embodiments, the scan line set SG7 may include three or more scan lines, according to the actual architecture and requirements of the display device 20 (e.g., a non-planar or irregular (or specially-shaped) display device).

The data line DL2 is arranged on the substrate 200. In the present embodiment, the data line DL2 may further include, in addition to the main line section M, the line section N and the line section O, another main line section Y, wherein the another main line section Y, the line section N and the line section O are spaced apart from one another. In the present embodiment, the data line DL2 may interlace with or cross over the scan lines SL1 to SL8 and the scan lines SL13 to SL16. For example, the another main line section Y interlaces with or crosses over the scan line set SG6 to form a plurality of crossing sections R6 (or namely, fourth crossing sections, as shown in dashed lines in FIG. 4). The data line DL2 may have a single-layer or multilayer structure, and the material thereof may include the material of the aforesaid data line DL1. The materials of these two data lines may be optionally substantially the same or different.

In the present embodiment, the scan lines SL1 to SL8 and SL13 to SL16 may be located in a different layer from the data line DL2, and an insulating layer (not illustrated) is interposed between the scan lines SL1 to SL8, SL13 to SL16 and the data line DL2. The insulating layer (not illustrated) may have a single-layer or multilayer structure, and the material thereof may include the material of the insulating layer (not illustrated) of the aforesaid embodiment. The materials of these two insulating layers may be optionally substantially the same or different.

The switch element SW1 (or namely first switch element), the switch element SW2 (or namely second switch element), the switch element SW5 (or namely third switch element) and the switch element SW6 (or namely fourth switch element) are disposed on the substrate 200. In the present embodiment, in addition to being electrically connected to the main line section M and the scan line SL3 of the scan line set SG3 via the switch element SW1, the line section N may further be electrically connected to the another main line section Y and the scan line SL15 of the scan line set SG7 via the switch element SW5; and in addition to being electrically connected to the main line section M and the scan line SL4 of the scan line set SG3 via the switch element SW2, the line section O may further be electrically connected to the another main line section Y and the scan line SL16 of the scan line set SG7 via the switch element SW6.

In the present embodiment, at least one of the switch element SW5 and the switch element SW6 may be any type of thin film transistor well-known to persons of ordinary skill in the art. The present embodiment gives an example in which bottom-gate thin film transistors are provided. The switch element SW5 includes a gate G5, a channel layer CH5, a source S5 and a drain D5, wherein the channel layer CH5 is located above the gate G5, and the source S5 and the drain D5 are located above the channel layer CH5; the switch element SW6 includes a gate G6, a channel layer CH6, a source S6 and a drain D6, wherein the channel layer CH6 is located above the gate G6, and the source S6 and the drain D6 are located above the channel layer CH6. In other embodiments, at least one of the switch element SW5 and the switch element SW6 may be a top-gate thin film transistor or other suitable transistor. In an example in which top-gate thin film transistors are provided, the switch element SW5 includes the gate G5, the channel layer CH5, the source S5 and the drain D5. The channel layer CH5 is located below the gate G5, and the other components are as previously described. The rest switch elements may be deduced by analogy.

In the present embodiment, the gate G5 of the switch element SW5 is connected to the scan line SL15, the drain D5 of the switch element SW5 is connected to the line section N, and the source S5 of the switch element SW5 is connected to the another main line section Y; the gate G6 of the switch element SW6 is connected to the scan line SL16, the drain D6 of the switch element SW6 is connected to the line section O, and the source S6 of the switch element SW6 is connected to the another main line section Y. In one embodiment, a portion of the scan line SL15 serves as the gate G5, a portion of the scan line SL16 serves as the gate G6, the drain D5 may be a portion of the line section N (it can be said that the drain D5 and the line section N form a continuous conductive pattern), the drain D6 may be a portion of the line section O (it can be said that the drain D6 and the line section O form a continuous conductive pattern), and the source S5 and the source S6 may respectively be portions of the another main line section Y (it can be said that the sources S5 to S6 respectively form a continuous conductive pattern with the another main line section Y).

In one embodiment, when a turn-on signal is input to the scan line SL15, the scan line SL15 is electrically connected to the gate G5 to turn on the switch element SW5. At this moment, when a data signal is input to the another main line section Y, the another main line section Y is electrically connected to the drain D5 to transmit the data signal to the line section N via the turned-on switch element SW5. In another embodiment, when a turn-on signal is input to the scan line SL16, the scan line SL16 is electrically connected to the gate G6 to turn on the switch element SW6. At this moment, when a data signal is input to the another main line section Y, the another main line section Y is electrically connected to the drain D6 to transmit the data signal to the line section O via the turned-on switch element SW6.

In the present embodiment, the main line section M may include two branches m1 and m2, and the another main line section Y may also include two branches y1 and y2. The branch y1 is electrically connected to the switch element SW5, and the branch y2 is electrically connected to the switch element SW6. From another point of view, in the present embodiment, the source S5 may be a portion of the branch y1 of the another main line section Y (it can be said that the source S5 and the branch y1 of the another main line section Y form a continuous conductive pattern), and the source S6 may be a portion of the branch y2 of the another main line section Y (it can be said that the source S6 and the branch y2 of the another main line section Y form a continuous conductive pattern). In addition, in the present embodiment, the length of the branch y1 and the length of the branch y2 may be different. The length of the branch y1 is, for example, greater than the length of the branch y2. However, the disclosure is not limited thereto.

The plurality of pixel units U1 (or namely first pixel units), the plurality of pixel units U2 (or namely second pixel units), the plurality of pixel units U3 (or namely third pixel units) and the plurality of pixel units U6 (or namely fourth pixel units) are disposed on the substrate 200. In the present embodiment, the plurality of pixel units U6 are disposed corresponding to the plurality of crossing sections R6, and the description of the plurality of pixel units U1, the plurality of pixel units U2 and the plurality of pixel units U3 as well as their relationships with other elements can be found in the aforesaid embodiment and will not be repeated herein.

Referring to FIG. 4 and FIG. 5 together, at least one pixel unit U6 may include a switching element 161, a switching element 162 and a micro-light emitting element L6, wherein the switching elements 161 and 162 are electrically connected to the micro-light emitting element L6. In addition, at least one pixel unit U6 further includes a capacitor 163, wherein the capacitor 163 is electrically connected to the switching element 161, the switching element 162 and the micro-light emitting element L6. In the present embodiment, description is given of an example in which at least one pixel unit U6 is of a 2T1C structure. However, the disclosure is not limited thereto. In the disclosure, the numbers of switching elements (abbreviated as T) and capacitors (abbreviated as C) in each pixel unit U6 are not limited. In other embodiments, at least one pixel unit U6 may be of a 1T1C structure, a 3T1C structure, a 3T2C structure, a 4T1C structure, a 4T2C structure, a 5T1C structure, a 5T2C structure, a 6T1C structure, a 6T2C structure, a 7T2C structure, or any possible structure.

The micro light emitting element L6 is, for example, a flip-chip micro-LED, a horizontal micro LED, a vertical micro-LED, or an organic micro-LED, and the micro-light emitting element L6 has a size of, for example, smaller than 100 microns, preferably smaller than 50 microns. On the other hand, the micro-light emitting element L6 is, for example, a red LED, a green LED, a blue LED, or an LED of any other color. The switching element 161 and the switching element 162 may be any bottom-gate thin film transistors, any top-gate thin film transistors, or any other suitable thin film transistors well-known to persons of ordinary skill in the art. Moreover, the structure of the thin film transistors may be understood with reference to the description relating to any of the aforesaid switch elements (e.g., the switch elements SW1 to SW4), wherein the switching element 161 includes a source 161a, a drain 161b and a gate 161c, the switching element 162 includes a source 162a, a drain 162b and a gate 162c, and the description of the channel layer (not denoted) can be found above and will not be repeated herein.

For example, the gate 162c of the switching element 162 is electrically connected to one scan line (e.g., the scan line SL13 or the scan line SL14) of the scan line set SG6, and the source 162a of the switching element 162 is electrically connected to the another main line section Y. The drain 161b of the switching element 161 is electrically connected to the high-level voltage source Vdd, an electrode 163a of the capacitor 163 is electrically connected to the gate 161c of the switching element 161 and the drain 162b of the switching element 162, an electrode 163b of the capacitor 163 is electrically connected to the source 161a of the switching element 161 and one end of the micro-light emitting element L6, and the other end of the micro-light emitting element L6 is electrically connected to the low-level voltage source Vss. However, the disclosure is not limited thereto.

In the present embodiment, the switching element 161 or the switching element 162 in the pixel unit U6 is electrically connected to the another main line section Y and one scan line of the scan line set SG6 in the corresponding crossing section R6.

In the present embodiment, the scan line SL1 or the scan line SL2 of the scan line set SG1 may be electrically connected to at least one pixel unit U1 and at least one pixel unit U2, the scan line SL5, the scan line SL6, the scan line SL7 or the scan line SL5 of the scan line set SG2 may only be electrically connected to at least one pixel unit U3, and the scan line SL13 or the scan line SL14 of the scan line set SG6 may only be electrically connected to at least one pixel unit U6. In the present embodiment, it can be known by calculation that the number of the pixel units electrically connected to one scan line of the scan line set SG1 is greater than the number of the pixel units electrically connected to one scan line of the scan line set SG2, and that the number of the pixel units electrically connected to one scan line of the scan line set SG1 is greater than the number of the pixel units electrically connected to one scan line of the scan line set SG6.

One scan line of the scan line set SG2 and one scan line of the scan line set SG6 are both electrically connected to fewer pixel units than one scan line of the scan line set SG1. Thus, when the substrate 200 of the display device 20 (e.g., a non-planar or irregular (or specially-shaped) display device) has, for example, a spherical shape, by causing the scan line sets SG2 and SG6 to correspond respectively to two end portions of the substrate 200 which have a smaller perimeter and causing the scan line set SG1 to correspond to the center portion of the substrate 200 which has a greater perimeter, the pixel units U1 to U3 and U6 can be more uniformly distributed in the display device 20, thus enabling the display device 20 to achieve better uniformity in a display image.

In the present embodiment, the line width W1 of the scan line SL1 and the line width W2 of the scan line SL2 of the scan line set SG1 may be greater than the line width W5 of the scan line SL5, the line width W6 of the scan line SL6, the line width W7 of the scan line SL7 and the line width W8 of the scan line SL8 of the scan line set SG2 as well as the line width W13 of the scan line SL13 and the line width W14 of the scan line SL14 of the scan line set SG6. As mentioned above, one scan line of the scan line set SG2 and one scan line of the scan line set SG6 are both electrically connected to fewer pixel units than one scan line of the scan line set SG1. Thus, in the case that one scan line of the scan line set SG2 and one scan line of the scan line set SG6 both have a smaller line width than one scan line of the scan line set SG1, the uniformity of RC loading of the display device 20 (e.g., a non-planar or irregular (or special-shaped) display device) can be improved.

Although FIG. 4 illustrates that the line width W1 of the scan line SL1 and the line width W2 of the scan line SL2 are greater than the line width W5 of the scan line SL5, the line width W6 of the scan line SL6, the line width W7 of the scan line SL7, the line width W8 of the scan line SL8, the line width W13 of the scan line SL13 and the line width W14 of the scan line SL14, the disclosure is not limited thereto. In other embodiments, the line width W1 of the scan line SL1 and the line width W2 of the scan line SL2 may be substantially equal to the line width W5 of the scan line SL5, the line width W6 of the scan line SL6, the line width W7 of the scan line SL7, the line width W8 of the scan line SL8, the line width W13 of the scan line SL13 and the line width W14 of the scan line SL14, or one of the line width W1 of the scan line SL1 and the line width W2 of the scan line SL2 is greater than one of the line width W5 of the scan line SL5, the line width W6 of the scan line SL6, the line width W7 of the scan line SL7 and the line width W8 of the scan line SL8 and one of the line width W13 of the scan line SL13 and the line width W14 of the scan line SL14.

In the present embodiment, a plurality of micro-light emitting elements L6 in at least two pixel units U6 may emit light of colors essentially (or substantially) not completely the same, light of essentially different colors, or light of essentially the same color. For example, in one embodiment, the micro-light emitting element L6 in the pixel unit U6 electrically connected to the scan line SL13 may be a green LED, and the micro light emitting element L6 in the pixel unit U6 electrically connected to the scan line SL14 may be a red LED, but not limited its. For another example, in one embodiment, the micro-light emitting element L6 in the pixel unit U6 may be a green LED, but not limited its.

In the present embodiment, as shown in FIG. 4, none of the switch element SW1, the switch element SW2, the switch element SW5 and the switch element SW6 is connected to the pixel unit U1, the pixel unit U2, the pixel unit U3 and the pixel unit U6. For example, in the present embodiment, the switch elements SW1, SW2, SW5 and SW6 are configured to transmit a data signal through the data line DL2 rather than to drive the micro light emitting elements L1 to L3 and L6 to emit light.

In the present embodiment, a distance X7 between the scan line SL15 and the scan line SL16 of the scan line set SG7 is smaller than the distance X1 between the scan line SL1 and the scan line SL2 of the scan line set SG1 and/or a distance X6 between the scan line SL13 and the scan line SL14 of the scan line set SG6. For example, in the present embodiment, the distance between any two adjacent scan lines of the scan line set SG1 and the distance between any two adjacent scan lines of the scan line set SG6 are both greater than the distance between any two adjacent scan lines of the scan line set SG7.

As mentioned above, in the present embodiment, none of the switch element SW1, the switch element SW2, the switch element SW5 and the switch element SW6 is connected to the pixel unit U1, the pixel unit U2, the pixel unit U3 and the pixel unit U6. Thus, in the case that the distance X3 between the scan line SL3 and the scan line SL4 configured to control the switch elements SW1 and SW2 and the distance X7 between the scan line SL15 and the scan line SL16 configured to control the switch elements SW5 and SW6 are smaller than the distance X1 between any two adjacent scan lines of the scan line set SG1 in contact with the pixel units U1 and U2, the distance X2 between any two adjacent scan lines of the scan line set SG2 in contact with the pixel unit U3, and the distance X6 between any two adjacent scan lines of the scan line set SG6 in contact with the pixel unit U6, the spatial utilization of the display device 20 (e.g., a non-planar or irregular (or special-shaped) display device) can be improved.

In the present embodiment, under substantially the same grayscale display, brightness of the micro light emitting element L6 of at least one of the pixel units U6 is lower than the brightness of the micro-light emitting element L1 of at least one of the pixel units U1, and the brightness of the micro-light emitting element L6 of at least one of the pixel units U6 is lower than the brightness of the micro-light emitting element L2 of at least one of the pixel units U2. For example, in the present embodiment, the brightness of at least one of the pixel units U6 connected to the another main line section Y may be lower than the brightness of at least one of the pixel units U1 connected to the line section N and the brightness of at least one of the pixel units U2 connected to the line section O.

In one embodiment, by causing a ratio between channel width and channel length of the switching element 161 and/or the switching element 162 of at least one of the pixel units U6 to be smaller than a ratio between channel width and channel length of the switching element 111 and/or the switching element 112 of at least one of the pixel units U1 and a ratio between channel width and channel length of the switching element 121 and/or the switching element 122 of at least one of the pixel units U2, the aforesaid brightness relationships between the pixel units U1 to U3 and U6 of the display device 20 (e.g., a non-planar or irregular (or specially-shaped) display device) can be achieved.

In another embodiment, by causing turn-on time of the switching element 161 and/or the switching element 162 of at least one of the pixel units U6 to be shorter than the turn-on time of the switching element 111 and/or the switching element 112 of at least one of the pixel units U1 and the turn-on time of the switching element 121 and/or the switching element 122 of at least one of the pixel units U2, the aforesaid brightness relationships between the pixel units U1 to U3 and U6 of the display device 20 (e.g., a non-planar or irregular (or specially-shaped) display device) can be achieved.

In another embodiment, by causing a driving voltage of the switching element 161 and/or the switching element 162 of at least one of the pixel units U6 to be less than the driving voltage of the switching element 111 and/or the switching element 112 of at least one of the pixel units U1 and the driving voltage of the switching element 121 and/or the switching element 122 of at least one of the pixel units U2, the aforesaid brightness relationships between the pixel units U1 to U3 and U6 of the display device 20 (e.g., a non-planar or irregular (or specially-shaped) display device) can be achieved.

In another embodiment, by causing a light emitting voltage of the micro-light emitting element L6 of at least one of the pixel units U6 to be less than the light emitting voltage of the micro-light emitting element L1 of at least one of the pixel units U1 and the light emitting voltage of the micro-light emitting element L2 of at least one of the pixel units U2, the aforesaid brightness relationships between the pixel units U1 to U3 and U6 of the display device 20 (e.g., a non-planar or irregular (or specially-shaped) display device) can be achieved.

As mentioned above, in the display device 20 (e.g., a non-planar or irregular (or specially-shaped) display device), the data line DL2 includes the main line section M, the line section N, the line section O and the another main line section Y, wherein the line section N interlaces with or crosses over the scan line set SG1 to form the crossing section R1, the line section O interlaces with or crosses over the scan line set SG1 to form the crossing section R2, the main line section M interlaces with or crosses over the scan line set SG2 to form the crossing section R3, the another main line section Y interlaces with or crosses over the scan line set SG6 to form the crossing section R6, the line section N is electrically connected to the main line section M and the scan line SL3 via the switch element SW1, the line section O is electrically connected to the main line section M and the scan line SL4 via the switch element SW2, the line section N is electrically connected to the another main line section Y and the scan line SL15 via the switch element SW5, the line section O is electrically connected to the another main line section Y and the scan line SL16 via the switch element SW6, and the pixel unit U1, the pixel unit U2, the pixel unit U3 and the pixel unit U6 are disposed corresponding to the crossing section R1, the crossing section R2, the crossing section R3 and the crossing section R6, respectively. Accordingly, in the case where the substrate 200 is a non-planar or irregular (or specially-shaped) substrate, the pixel units U1 to U3 and U6 can be more uniformly distributed in the display device 20, namely a non-planar or irregular (or specially-shaped) display device. In this way, when the display device 20 performs display, better uniformity in the display image can be maintained.

Figure 6:
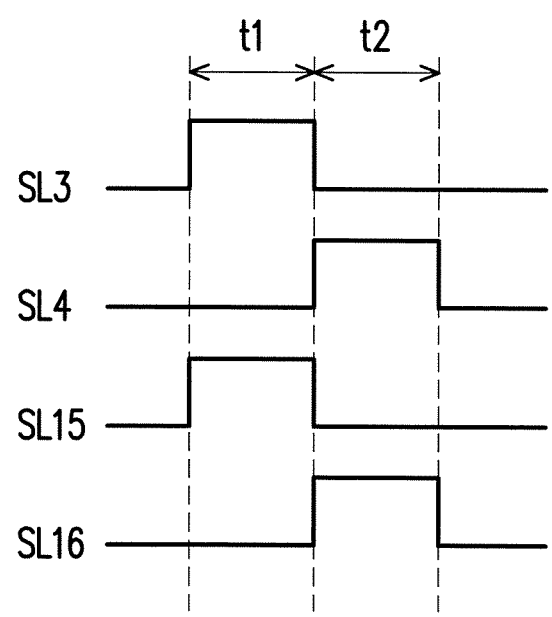
FIG. 6 is a schematic view of waveforms of a scan line SL3, a scan line SL4, a scan line SL15 and a scan line SL16 in FIG. 4.

In a display mode, the display device 20 (e.g., a non-planar or irregular (or specially-shaped) display device) may perform display by a time division technique. Hereinafter, a control method of the display device 20 will be further described with reference to FIG. 6. FIG. 6 is a schematic view of waveforms of the scan line SL3, the scan line SL4, the scan line SL15 and the scan line SL16 in FIG. 4.

Referring to FIG. 6 and FIG. 4 together, during the frame time t1 (or namely when in a first time), a turn-on signal is input respectively to the scan line SL3 and the scan line SL15 to turn on the switch element SW1 and the switch element SW5, without being input to the scan line SL4 and the scan line SL16. At this moment, the switch element SW2 and the switch element SW6 are not turned on, and a data signal (or namely first data signal) transmitted by the another main line section Y is transmitted to the line section N via the turned-on switch element SW5, and then transmitted to the main line section M via the turned-on switch element SW1. During the frame time t2 (or namely when in a second time), a turn-on signal is input respectively to the scan line SL4 and the scan line SL16 to turn on the switch element SW2 and the switch element SW6, without being input to the scan line SL3 and the scan line SL15. At this moment, the switch element SW1 and the switch element SW5 are not turned on, and a data signal (or namely second data signal) transmitted by the another main line section Y is transmitted to the line section O via the turned-on switch element SW6, and then transmitted to the main line section M via the turned-on switch element SW2. In other embodiments, during a different frame time t1 or t2, signals may be transmitted from the main line section M to the line section N and the line section O respectively and then to the another main line section Y, and the other connection relationships may be understood with reference to the above description. In this way, during the frame time t1, the pixel unit U6, the pixel unit U1 and the pixel unit U3 display a display image; during the frame time t2, the pixel unit U6, the pixel unit U2 and the pixel unit U3 display a display image.

In the present embodiment, by using the micro-light emitting elements L1 to L3 and L6 having fast response time and high operation frequency, a drive scanning rate of the display device 20 (e.g., a non-planar or irregular (or specially-shaped) display device) is, for example, greater than or equal to about 120 Hz. In this way, after the frame time t1 and the frame time t2 have elapsed, when the observer views an image displayed by the display device 20, they do not feel any interruption or flicker in the image due to persistence of vision of the human eye. Thus, the effect of improving uniformity in the display image is achieved.

In addition, as mentioned above, the pixel unit U3 and the pixel unit U6 display a display image during both the frame time t1 and the frame time t2. Thus, by causing the brightness of at least one of the pixel units U3 and the brightness of at least one of the pixel units U6 to be lower than the brightness of at least one of the pixel units U1 and the brightness of at least one of the pixel units U2, the image output by the same signal and displayed by the display device 20 (e.g., a non-planar or irregular (or specially-shaped) display device) after experiencing the frame time t1 and the frame time t2 becomes more uniform in brightness when viewed by the observer.

Although FIG. 5 illustrates that at least one pixel unit U6 includes one micro-light emitting element L6, the disclosure is not limited thereto. In other embodiments, at least one pixel unit U6 may include a plurality of micro-light emitting elements L6 of substantially the same color or a plurality of micro-light emitting elements L6 of different colors. When at least one pixel unit U6 includes a plurality of micro-light emitting elements L6 of different colors, the plurality of micro-light emitting elements L6 are independently driven. That is, although the plurality of micro-light emitting elements L6 are driven by the same scan line, the micro-light emitting elements L6 can be controlled by different switching elements.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A display device, comprising:
a plurality of scan lines disposed on a substrate, wherein the scan lines have a first scan line set, a second scan line set and a third scan line set;
at least one first switch element and at least one second switch element disposed on the substrate;
at least one data line disposed on the substrate, wherein the at least one data line comprises:
a main line section, a first line section and a second line section spaced apart from one another, wherein the first line section crosses over the first scan line set to form a plurality of first crossing regions, the second line section crosses over the first scan line set to form a plurality of second crossing regions, the main line section crosses over the second scan line set to form a plurality of third crossing regions, the first line section is directly connected to the main line section and one of the scan lines of the third scan line set via the at least one first switch element, and the second line section is directly connected to the main line section and another one of the scan lines of the third scan line set via the at least one second switch element, and wherein the first line section and the second line section do not cross over the second scan line set; and
a plurality of pixel units comprising a plurality of first pixel units, a plurality of second pixel units and a plurality of third pixel units disposed on the substrate and corresponding respectively to the first crossing regions, the second crossing regions and the third crossing regions, wherein each of the first pixel units, each of the second pixel units and each of the third pixel units comprises at least one switching element and at least one micro-light emitting element electrically connected to the at least one switching element, and the switching elements of the first pixel units, the second pixel units and the third pixel units are respectively electrically connected to the first line section and one of the scan lines of the first scan line set in the corresponding first crossing regions, the second line section and one of the scan lines of the first scan line set in the corresponding second crossing regions, and the main line section and one of the scan lines of the second scan line set in the corresponding third crossing regions.

2. The display device of claim 1, wherein:
a gate of the at least one first switch element is connected to the one scan line of the third scan line set, a source of the at least one first switch element is connected to the first line section, and a drain of the at least one first switch element is connected to the main line section; and
a gate of the at least one second switch element is connected to the another scan line of the third scan line set, a source of the at least one second switch element is connected to the second line section, and a drain of the at least one second switch element is connected to the main line section.

3. The display device of claim 1, wherein neither of the at least one first switch element and the at least one second switch element is connected to the first pixel units, the second pixel units and the third pixel units.

4. The display device of claim 1, wherein the main line section comprises at least two branches, and one of the two branches is electrically connected to the at least one first switch element and the first line section, and another one of the two branches is electrically connected to the at least one second switch element and the second line section.

5. The display device of claim 1, wherein the main line section comprises at least two branches, and a length of one of the two branches is greater than a length of another one of the two branches.

6. The display device of claim 1, wherein a line width of the one scan line of the first scan line set is greater than a line width of the one scan line of the second scan line set.

7. The display device of claim 1, wherein brightness of the micro-light emitting element of at least one of the third pixel units is lower than brightness of the micro-light emitting element of at least one of the first pixel units, and the brightness of the micro-light emitting element of at least one of the third pixel units is lower than brightness of the micro-light emitting element of at least one of the second pixel units.

8. The display device of claim 1, wherein in a direction perpendicular to an extending direction of the scan lines, a distance between any two adjacent scan lines of the third scan line set is smaller than a distance between any two adjacent scan lines of the first scan line set, and the distance between any two adjacent scan lines of the third scan line set is smaller than a distance between any two adjacent scan lines of the second scan line set.

9. The display device of claim 1, further comprising:
a third switch element and a fourth switch element disposed on the substrate, wherein:
the scan lines further have a fourth scan line set and a fifth scan line set;
the at least one data line further comprises a third line section and a fourth line section, and the main line section, the third line section and the fourth line section are spaced apart from one another, wherein the third line section crosses over the fourth scan line set to form a plurality of fourth crossing regions, the fourth line section crosses over the fourth scan line set to form a plurality of fifth crossing regions, the third line section is electrically connected to the main line section and one of the scan lines of the fifth scan line set via the third switch element, and the fourth line section is electrically connected to the main line section and another one of the scan lines of the fifth scan line set via the fourth switch element.

10. The display device of claim 9, wherein:
the third line section crosses over the one scan line of the fifth scan line set to form an eighth crossing region, and the pixel units are not disposed corresponding to the eighth crossing region; and
the fourth line section crosses over the another one scan line of the fifth scan line set to form a ninth crossing region, and the pixel units are not disposed corresponding to the ninth crossing region.

11. The display device of claim 9, wherein the pixel units further comprise a plurality of fourth pixel units and a plurality of fifth pixel units disposed on the substrate and corresponding respectively to the fourth crossing regions and the fifth crossing regions, wherein each of the fourth pixel units and the fifth pixel units comprises the at least one switching element and the at least one micro-light emitting element, the switching elements of the fourth pixel units and the fifth pixel units are respectively electrically connected to the third line section and one of the scan lines of the fourth scan line set in the corresponding fourth crossing regions and the fourth line section and one of the scan lines of the fourth scan line set in the corresponding fifth crossing regions.

12. The display device of claim 11, wherein:
a gate of the third switch element is connected to the one scan line of the fifth scan line set, a source of the third switch element is connected to the third line section, and a drain of the third switch element is connected to the main line section; and
a gate of the fourth switch element is connected to the another scan line of the fifth scan line set, a source of the fourth switch element is connected to the fourth line section, and a drain of the fourth switch element is connected to the main line section.

13. The display device of claim 11, wherein neither of the third switch element and the fourth switch element is connected to the first pixel units, the second pixel units, the third pixel units, the fourth pixel units and the fifth pixel units.

14. The display device of claim 11, wherein the main line section comprises at least another two branches, and one of the another two branches is electrically connected to the third switch element and the third line section, and another one of the another two branches is electrically connected to the fourth switch element and the fourth line section.

15. The display device of claim 11, wherein the main line section comprises at least another two branches, and a length of one of the another two branches is greater than a length of another one of the another two branches.

16. The display device of claim 11, wherein a line width of the one scan line of the fourth scan line set is greater than a line width of the one scan line of the second scan line set.

17. The display device of claim 11, wherein brightness of the micro-light emitting element of at least one of the third pixel units is lower than brightness of the micro-light emitting element of at least one of the fourth pixel units, and the brightness of the micro-light emitting element of at least one of the third pixel units is lower than brightness of the micro-light emitting element of at least one of the fifth pixel units.

18. The display device of claim 11, wherein in a direction perpendicular to an extending direction of the scan lines, a distance between any two adjacent scan lines of the fifth scan line set is smaller than a distance between any two adjacent scan lines of the second scan line set, and the distance between any two adjacent scan lines of the fifth scan line set is smaller than a distance between any two adjacent scan lines of the fourth scan line set.

19. The display device of claim 1, further comprising:
a third switch element and a fourth switch element disposed on the substrate, wherein:
the scan lines further have a fourth scan line set and a fifth scan line set;
the at least one data line further comprises another main line section, and the another main line section, the first line section and the second line section are spaced apart from one another, wherein the another main line section crosses over the fourth scan line set to form a plurality of fourth crossing regions, the first line section is further electrically connected to the another main line section and one of the scan lines of the fifth scan line set via the third switch element, and the second line section is further electrically connected to the another main line section and another one of the scan lines of the fifth scan line set via the fourth switch element.

20. The display device of claim 19, wherein the pixel units further comprise a plurality of fourth pixel units disposed on the substrate and corresponding respectively to the fourth crossing regions, wherein each of the fourth pixel units comprises the at least one switching element and the at least one micro light emitting element, and the switching elements of the fourth pixel units are respectively electrically connected to the another main line section and one of the scan lines of the fourth scan line set in the corresponding fourth crossing regions.

21. The display device of claim 20, wherein:
a gate of the third switch element is connected to the one scan line of the fifth scan line set, a source of the third switch element is connected to the first line section, and a drain of the third switch element is connected to the another main line section; and
a gate of the fourth switch element is connected to the another scan line of the fifth scan line set, a source of the fourth switch element is connected to the second line section, and a drain of the fourth switch element is connected to the another main line section.

22. The display device of claim 20, wherein neither of the third switch element and the fourth switch element is connected to the first pixel units, the second pixel units, the third pixel units and the fourth pixel units.

23. The display device of claim 20, wherein the another main line section comprises at least another two branches, and one of the another two branches is electrically connected to the third switch element and the first line section, and another one of the another two branches is electrically connected to the fourth switch element and the second line section.

24. The display device of claim 20, wherein the another main line section comprises at least another two branches, and a length of one of the another two branches is greater than a length of another one of the another two branches.

25. The display device of claim 20, wherein a line width of the one scan line of the fourth scan line set is smaller than a line width of the one scan line of the first scan line set.

26. The display device of claim 20, wherein brightness of the micro-light emitting element of at least one of the fourth pixel units is lower than brightness of the micro-light emitting element of at least one of the first pixel units, and the brightness of the micro-light emitting element of at least one of the fourth pixel units is lower than brightness of the micro-light emitting element of at least one of the second pixel units.

27. The display device of claim 20, wherein in a direction perpendicular to an extending direction of the scan lines, a distance between any two adjacent scan lines of the fifth scan line set is smaller than a distance between any two adjacent scan lines of the first scan line set, and the distance between any two adjacent scan lines of the fifth scan line set is smaller than a distance between any two adjacent scan lines of the fourth scan line set.

28. The display device of claim 1, wherein a drain of the at least one first switch element is directly connected to the main line section, and a drain of the at least one second switch element is directly connected to the main line section.

29. The display device of claim 1, wherein:
the first line section crosses over the one scan line of the third scan line set to form a sixth crossing region, and the pixel units are not disposed corresponding to the sixth crossing region; and
the second line section crosses over the another one scan line of the third scan line set to form a seventh crossing region, and the pixel units are not disposed corresponding to the seventh crossing region.

* * * * *